United States Patent
Maehama et al.

(10) Patent No.: US 10,821,426 B2
(45) Date of Patent: Nov. 3, 2020

(54) METAL-CONTAINING CHA-TYPE ZEOLITE AND METHOD FOR PRODUCING THE SAME

(71) Applicant: TOSOH CORPORATION, Yamaguchi (JP)

(72) Inventors: Seiji Maehama, Yamaguchi (JP); Hidekazu Aoyama, Yamaguchi (JP); Satoshi Nakamura, Yamaguchi (JP); Yusuke Naraki, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 43 days.

(21) Appl. No.: 16/155,372

(22) Filed: Oct. 9, 2018

(65) Prior Publication Data

US 2019/0105639 A1 Apr. 11, 2019

(30) Foreign Application Priority Data

Oct. 11, 2017 (JP) .................. 2017-197491

(51) Int. Cl.
*C01B 39/48* (2006.01)
*B01J 29/70* (2006.01)
(Continued)

(52) U.S. Cl.
CPC ............. *B01J 29/723* (2013.01); *B01J 23/72* (2013.01); *B01J 29/7015* (2013.01); *B01J 29/76* (2013.01);
(Continued)

(58) Field of Classification Search
CPC ........ C01B 39/026; C01B 39/48; B01J 20/18; B01J 29/7015; B01J 29/763; B01J 29/723;
(Continued)

(56) References Cited

U.S. PATENT DOCUMENTS

| 4,544,538 A | 10/1985 | Zones |
| 4,665,110 A | 5/1987 | Zones |

(Continued)

FOREIGN PATENT DOCUMENTS

| EP | 3152162 | 12/2015 |
| EP | 3366644 | 2/2018 |

(Continued)

OTHER PUBLICATIONS

Dustin W. Fickel et al., "Copper Coordination in Cu-SSZ-13 and Cu-SSZ-16 Investigated by Variable-Temperature XRD", J. Phys. Chem. C. 114, 2010, pp. 1633-1640.

(Continued)

*Primary Examiner* — David M Brunsman
(74) *Attorney, Agent, or Firm* — Greenblum & Bernstein, P.L.C.

(57) ABSTRACT

Provided is a metal-containing CHA-type zeolite in which a ratio of a maximum intensity of an absorption peak in a range of 3685 $cm^{-1}$ or more and 3750 $cm^{-1}$ or less to a maximum intensity of an absorption peak in a range of 1800 $cm^{-1}$ or more and 1930 $cm^{-1}$ or less is less than 1.5 in an IR spectrum. A method for producing the metal-containing CHA-type zeolite includes a metal incorporation step of mixing a metal source and a CHA-type zeolite in which a ratio of a maximum intensity of an absorption peak in a range of 3665 $cm^{-1}$ or more and 3750 $cm^{-1}$ or less to a maximum intensity of an absorption peak in a range of 1800 $cm^{-1}$ or more and 1930 $cm^{-1}$ or less is less than 1.5 in an IR spectrum.

18 Claims, 3 Drawing Sheets

(51) Int. Cl.
  *B01J 29/72* (2006.01)
  *C01B 39/46* (2006.01)
  *B01J 23/72* (2006.01)
  *B01J 29/76* (2006.01)
  *B01J 37/02* (2006.01)
  *B01J 20/18* (2006.01)
(52) U.S. Cl.
  CPC ......... *B01J 29/763* (2013.01); *B01J 37/0201* (2013.01); *C01B 39/46* (2013.01); *C01B 39/48* (2013.01); *B01J 20/18* (2013.01); *C01P 2002/72* (2013.01); *C01P 2002/82* (2013.01)
(58) Field of Classification Search
  CPC .. B01J 29/76; B01D 53/9418; C01P 2002/72; C01P 2002/82
  See application file for complete search history.

(56) References Cited

U.S. PATENT DOCUMENTS

| | | |
|---|---|---|
| 2003/0069449 A1 | 4/2003 | Zones et al. |
| 2007/0100185 A1 | 3/2007 | Cao et al. |
| 2010/0092362 A1 | 4/2010 | Li |
| 2011/0182790 A1 | 7/2011 | Chandler et al. |
| 2011/0251048 A1 | 10/2011 | Ariga et al. |
| 2013/0323164 A1 | 12/2013 | Feyen et al. |
| 2015/0284255 A1* | 10/2015 | Maurer ................ B01J 29/7038 423/714 |
| 2018/0186648 A1* | 7/2018 | Feyen .................... C01B 39/48 |
| 2018/0237307 A1 | 8/2018 | Nakao et al. |
| 2018/0362357 A1* | 12/2018 | Feyen .................... C01B 39/48 |

FOREIGN PATENT DOCUMENTS

| | | |
|---|---|---|
| WO | 2013/182974 | 12/2013 |
| WO | 2017100384 | 6/2017 |

OTHER PUBLICATIONS

S.I. Zones et al., "Novel zeolite transformations: The template-mediated conversion of Cubic P zeolite to SSZ-13", ZEOLITES, vol. 8, 1988, pp. 166-174.

* cited by examiner

METAL-CONTAINING CHA-TYPE ZEOLITE AND METHOD FOR PRODUCING THE SAME

BACKGROUND OF THE INVENTION

1. Field of the Invention

The present invention relates to a metal-containing CHA-type zeolite and a method for producing the same. In particular, the present invention relates to a metal-containing CHA-type zeolite suitable for use as a catalyst for reduction of nitrogen oxides and suitable for industrial use and a method for producing the same.

2. Description of the Related Art

Chabazite-type zeolites (hereinafter referred to as "CHA-type zeolites") are zeolites having a three-dimensional pore structure and including 8-membered oxygen rings forming a pore with a size of 3.8×3.8 Å. Although CHA-type zeolites exist as naturally occurring zeolites, CHA-type zeolites having a high molar ratio of silica to alumina exist only as artificially synthesized zeolites (for example, U.S. Pat. Nos. 4,544,538 and 4,665,110, U.S. Patent Application Publication Nos. 2007/0100185 and 2011/0251048, J. Phys. Chem. C, 114 (2010) 1633-1640 and ZEOLITES, Vol. 8 (1988) 166-174).

CHA-type zeolites having a high molar ratio of silica to alumina are used as various catalysts. Such CHA-type zeolites are widely used as a catalyst for reduction of nitrogen oxides in selective catalytic reduction (SCR) among the applications to the catalysts (U.S. Patent Application Publication Nos. 2003/0069449, 2011/0182790, and 2010/0092362 and International Publication No. 2013/182974).

For example, International Publication No. 2013/182974 discloses that a CHA-type zeolite obtained by using a seed crystal and N,N,N-trimethylcyclohexylammonium hydroxide, which serves as a specific structure-directing agent, in combination is a CHA-type zeolite suitable for use as an SCR catalyst compared with existing SSZ-62.

SUMMARY OF THE INVENTION

An object of the present invention is to provide a metal-containing CHA-type zeolite having good nitrogen oxide reduction properties and different from existing CHA-type zeolites and a method for producing the metal-containing CHA-type zeolite.

The inventors of the present invention have studied on metal-containing CHA-type zeolites suitable for use as a catalyst for reduction of nitrogen oxides. As a result, the inventors of the present invention have found metal-containing CHA-type zeolites whose IR spectra are different from those of exiting CHA-type zeolites and found that these metal-containing CHA-type zeolites have good nitrogen oxide reduction properties. This finding led to the completion of the present invention.

Specifically, the gist of the present invention is as follows.

[1] A metal-containing CHA-type zeolite wherein a ratio of a maximum intensity of an absorption peak in a range of 3685 $cm^{-1}$ or more and 3750 $cm^{-1}$ or less to a maximum intensity of an absorption peak in a range of 1800 $cm^{-1}$ or more and 1930 $cm^{-1}$ or less is less than 1.5 in an IR spectrum.

[2] The metal-containing CHA-type zeolite according to [1], wherein a ratio of a maximum intensity of an absorption peak in a range of 3450 $cm^{-1}$ or more and 3545 $cm^{-1}$ or less to the maximum intensity of the absorption peak in the range of 1800 $cm^{-1}$ or more and 1930 $cm^{-1}$ or less is less than 1.6 in the IR spectrum.

[3] The metal-containing CHA-type zeolite according to [1] or [2], wherein a ratio of a maximum intensity of an absorption peak in a range of 3550 $cm^{-1}$ or more and 3680 $cm^{-1}$ or less to the maximum intensity of the absorption peak in the range of 1800 $cm^{-1}$ or more and 1930 $cm^{-1}$ or less is less than 7.0 in the IR spectrum.

[4] The metal-containing CHA-type zeolite according to any one of [1] to [3], wherein an XRD pattern of the metal-containing CHA-type zeolite has at least XRD peaks shown in a table below.

TABLE 1

| 2θ | d-value (Å) | Relative Intensity* |
|---|---|---|
| 9.44° to 9.88° | 9.36 to 8.94 | 100 |
| 16.03° to 16.55° | 5.52 to 5.35 | 10 or more and 50 or less |
| 17.81° to 18.24° | 4.98 to 4.86 | 10 or more and 50 or less |
| 20.62° to 21.30° | 4.30 to 4.17 | 105 or more and 150 or less |
| 25.02° to 25.50° | 3.56 to 3.49 | 40 or more and 60 or less |

*The relative intensity represents an intensity relative to a peak intensity at 2θ = 9.44° to 9.88°.

[5] The metal-containing CHA-type zeolite according to any one of [1] to [4], wherein a molar ratio of silica to alumina is 10.0 or more and 55.0 or less.

[6] The metal-containing CHA-type zeolite according to any one of [1] to [5], wherein a molar ratio of silica to alumina is 10.0 or more and 31.5 or less.

[7] The metal-containing CHA-type zeolite according to any one of [1] to [6], wherein the metal-containing CHA-type zeolite contains at least one of iron or copper as a metal.

[8] The metal-containing CHA-type zeolite according to any one of [1] to [7], wherein a molar ratio of copper to aluminum is 0.10 or more and 0.50 or less.

[9] A method for producing the metal-containing CHA-type zeolite according to any one of [1] to [8], the method comprising a metal incorporation step of mixing a metal source and a CHA-type zeolite in which a ratio of a maximum intensity of an absorption peak in a range of 3665 $cm^{-1}$ or more and 3750 $cm^{-1}$ or less to a maximum intensity of an absorption peak in a range of 1800 $cm^{-1}$ or more and 1930 $cm^{-1}$ or less is less than 1.5 in an IR spectrum.

[10] The method according to [9], wherein a ratio of a maximum intensity of an absorption peak in a range of 3450 $cm^{-1}$ or more and 3545 $cm^{-1}$ or less to the maximum intensity of the absorption peak in the range of 1800 $cm^{-1}$ or more and 1930 $cm^{-1}$ or less is less than 1.6 in the CHA-type zeolite.

[11] The method according to [9] or [10], wherein an XRD pattern of the CHA-type zeolite has at least XRD peaks shown in a table below.

TABLE 2

| 2θ | d-value (Å) | Relative Intensity* |
|---|---|---|
| 9.44° to 9.88° | 9.36 to 8.94 | 100 |
| 16.03° to 16.55° | 5.52 to 5.35 | 11 or more and 34 or less |
| 17.81° to 18.24° | 4.98 to 4.86 | 10 or more and 50 or less |
| 20.62° to 21.30° | 4.30 to 4.17 | 61 or more and 98 or less |
| 25.02° to 25.50° | 3.56 to 3.49 | 20 or more and 60 or less |

*The relative intensity represents an intensity relative to a peak intensity at 2θ = 9.44° to 9.88°.

[12] The method according to any one of [9] to [11], wherein a molar ratio of silica to alumina in the CHA-type zeolite is 10.0 or more and 55.0 or less.

[13] The method according to any one of [9] to [12], wherein a molar ratio of silanol groups to silicon in the CHA-type zeolite is $0.15 \times 10^{-2}$ or more and $1.80 \times 10^{-2}$ or less.

[14] A catalyst comprising the metal-containing CHA-type zeolite according to any one of [1] to [8].

[15] A method for reducing a nitrogen oxide, the method comprising using the metal-containing CHA-type zeolite according to any one of [1] to [8].

The present invention can provide a metal-containing CHA-type zeolite having good nitrogen oxide reduction properties and different from existing CHA-type zeolites and a method for producing the metal-containing CHA-type zeolite.

BRIEF DESCRIPTION OF THE DRAWINGS

FIG. 1A illustrates a terminal portion of the network structure of the framework structure, and FIG. 1B illustrates an end portion in the network structure of the framework structure;

DESCRIPTION OF THE PREFERRED EMBODIMENTS

The present embodiment relates to CHA-type zeolites. In the present embodiment, the CHA-type zeolites are crystalline aluminosilicates having a crystal structure identified as the CHA structure in the framework type codes defined by the International Zeolite Association (hereinafter, also simply referred to as a "CHA structure"). The CHA structure can be identified by a powder X-ray diffraction (hereinafter referred to as "XRD") pattern.

Conditions for the XRD measurement in the present embodiment may be the conditions described below.
Radiation source: CuKα rays (λ=1.5405 Å)
Measurement mode: Step scanning
Scanning condition: 0.04°/sec
Measurement time: 3 seconds
Measurement range: 2θ=5° to 43°

In the present embodiment, the CHA-type zeolites are crystalline aluminosilicates having the CHA structure. The crystalline aluminosilicates are formed of crystals having a framework structure which is a three-dimensional network structure including aluminum (Al) and silicon (Si) as framework metals (hereinafter also referred to as "T atoms") in which the T atoms are bonded together with oxygen (O) therebetween. In the present embodiment, the CHA-type zeolites do not include zeolite analogues such as silicoaluminophosphates (SAPO) and aluminophosphates (AlPO) that contain phosphorus (P) as a T atom. A specific example of the zeolite analogue having the CHA structure is SAPO-34.

Figure 1A:
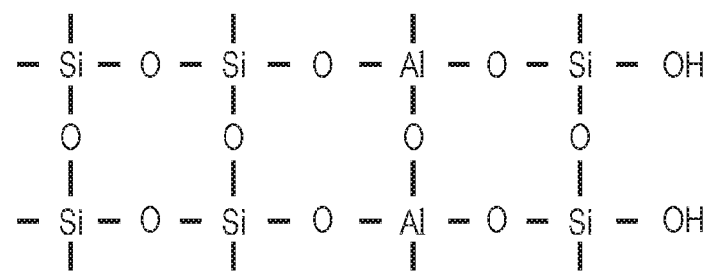
FIGS. 1A and 1B are schematic views illustrating framework end portions of a CHA-type zeolite.
Figure 1B:
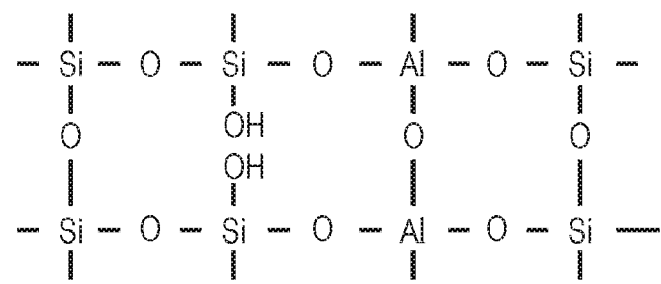

Conceptual or ideal crystalline aluminosilicates are constituted by the network structure alone, specifically, repetition of the —O—Al—O—Si—O— structure alone. In contrast, as illustrated in FIGS. 1A and 1B, crystalline aluminosilicates that actually exist have a terminal portion (FIG. 1A) of the network structure and an end portion (FIG. 1B) in the network structure (hereinafter, these are also collectively referred to as a "framework end portion"), and the framework end portion forms a silanol group (Si—OH). The CHA-type zeolites in the present embodiment are crystalline aluminosilicates that actually exist. Accordingly, the crystals of the CHA-type zeolites include silanol groups.

Hereinafter, metal-containing CHA-type zeolites according to the present embodiment will be described.

A metal-containing CHA-type zeolite according to the present embodiment is a metal-containing CHA-type zeolite in which a ratio of a maximum intensity of an absorption peak in a range of 3685 $cm^{-1}$ or more and 3750 $cm^{-1}$ or less to a maximum intensity of an absorption peak in a range of 1800 $cm^{-1}$ or more and 1930 $cm^{-1}$ or less is less than 1.5 in an IR spectrum.

The shape of the IR spectrum of the metal-containing CHA-type zeolite according to the embodiment, and the number and the intensities of absorption peaks included in the IR spectrum are not particularly limited.

In an IR spectrum of the metal-containing CHA-type zeolite according to the embodiment, a ratio of a maximum intensity of an absorption peak in a range of 3685 $cm^{-1}$ or more and 3750 $cm^{-1}$ or less (hereinafter also referred to as "Peak-2") to a maximum intensity of an absorption peak in a range of 1800 $cm^{-1}$ or more and 1930 $cm^{-1}$ or less (hereinafter also referred to as "Peak-1") is less than 1.5, preferably 1.0 or less, and more preferably 0.7 or less. The ratio of the maximum intensity of the Peak-2 to the maximum intensity of the Peak-1 (hereinafter also referred to as a "ratio P2/P1") becomes minimum when the metal-containing CHA-type zeolite of the embodiment does not have Peak-2, and the value of the ratio P2/P1 is 0 (zero).

Preferably, the ratio P2/P1 is 0 or more and less than 1.5, more preferably 0 or more and 1.0 or less, more preferably 0 or more and 0.7 or less, more preferably more than 0 and 0.7 or less, and more preferably more than 0 and 0.5 or less.

Preferably, in the IR spectrum of the metal-containing CHA-type zeolite according to the embodiment, a ratio of a maximum intensity of an absorption peak in a range of 3450 $cm^{-1}$ or more and 3545 $cm^{-1}$ or less (hereinafter also referred to as "Peak-3") to the maximum intensity of Peak-1 is less than 1.6. The ratio of the maximum intensity of Peak-3 to the maximum intensity of Peak-1 (hereinafter also referred to as a "ratio P3/P1") becomes minimum when the metal-containing CHA-type zeolite of the embodiment does not have Peak-3, and the value of the ratio P3/P1 is 0 (zero).

Preferably, the ratio P3/P1 is 0 or more and less than 1.6, more preferably 0 or more and 1.5 or less, more preferably 0 or more and 1.0 or less, and more preferably 0 or more and 0.5 or less.

Preferably, in the IR spectrum of the metal-containing CHA-type zeolite according to the embodiment, a ratio of a maximum intensity of an absorption peak in a range of 3550 $cm^{-1}$ or more and 3680 $cm^{-1}$ or less (hereinafter also referred to as "Peak-4") to the maximum intensity of Peak-1 is less than 7.0. The ratio of the maximum intensity of Peak-4 to the maximum intensity of Peak-1 (hereinafter also referred to as a "ratio P4/P1") becomes minimum when the metal-containing CHA-type zeolite of the embodiment does not have Peak-4, and the value of the ratio P4/P1 is 0 (zero).

Preferably, the ratio P4/P1 is 0 or more and less than 7.0, preferably 0 or more and 5.0 or less, more preferably 0 or more and less than 3.0, more preferably 0 or more and 2.0 or less, more preferably 0 or more and 1.8 or less, more preferably 0 or more and 1.7 or less, more preferably more than 0 and 1.7 or less, and more preferably more than 0 and 1.5 or less.

Preferably, Peak-1 to Peak-4 are absorption peaks in any of the ranges described below.

Peak-1: 1800 cm$^{-1}$ or more and 1930 cm$^{-1}$ or less, preferably 1800 cm$^{-1}$ or more and 1900 cm$^{-1}$ or less, and more preferably 1820 cm$^{-1}$ or more and 1860 cm$^{-1}$ or less Peak-2: 3685 cm$^{-1}$ or more and 3750 cm$^{-1}$ or less, preferably 3685 cm$^{-1}$ or more and 3740 cm$^{-1}$ or less, preferably 3702 cm$^{-1}$ or more and 3735 cm$^{-1}$ or less, and more preferably 3710 cm$^{-1}$ or more and 3735 cm$^{-1}$ or less Peak-3: 3450 cm$^{-1}$ or more and 3545 cm$^{-1}$ or less, preferably 3470 cm$^{-1}$ or more and 3530 cm$^{-1}$ or less, and more preferably 3480 cm$^{-1}$ or more and 3520 cm$^{-1}$ or less Peak-4: 3550 cm$^{-1}$ or more and 3680 cm$^{-1}$ or less, preferably 3610 cm$^{-1}$ or more and 3670 cm$^{-1}$ or less, and more preferably 3640 cm$^{-1}$ or more and 3670 cm$^{-1}$ or less Conditions for the measurement of an IR spectrum in the present embodiment may be the conditions described below.

Measuring method: Diffuse reflectance method
Measurement wavenumber range: 400 to 4000 cm$^{-1}$
Resolution: 4 cm$^{-1}$
Number of acquisitions: 128 times The metal-containing CHA-type zeolite of the embodiment preferably has the CHA structure alone as a crystal structure and more preferably has the CHA structure as a single phase without including any crystal structure other than the CHA structure.

Preferably, an XRD pattern of the metal-containing CHA-type zeolite of the embodiment has at least XRD peaks shown in the table below.

TABLE 3

| 2θ | d-value (Å) | Relative intensity* Preferred value | More preferred value |
|---|---|---|---|
| 9.44° to 9.88° | 9.36 to 8.94 | 100 | 100 |
| 16.03° to 16.55° | 5.52 to 5.35 | 10 or more and 50 or less | 34 or more and 50 or less |
| 17.81° to 18.24° | 4.98 to 4.86 | 10 or more and 50 or less | 25 or more and 50 or less |
| 20.62° to 21.30° | 4.30 to 4.17 | 105 or more and 150 or less | 110 or more and 130 or less |
| 25.02° to 25.50° | 3.56 to 3.49 | 40 or more and 60 or less | 41 or more and 50 or less |

*The relative intensity represents an intensity relative to the peak intensity at 2θ = 9.44° to 9.88°.

More preferably, an XRD pattern of the metal-containing CHA-type zeolite of the embodiment has at least XRD peaks shown in the table below.

TABLE 4

| 2θ | d-value (Å) | Relative intensity* Preferred value | More preferred value |
|---|---|---|---|
| 9.55° to 9.77° | 9.25 to 9.05 | 100 | 100 |
| 16.16° to 16.42° | 5.48 to 5.39 | 10 or more and 50 or less | 34 or more and 50 or less |
| 17.89° to 18.05° | 4.95 to 4.91 | 10 or more and 50 or less | 30 or more and 50 or less |
| 20.79° to 21.13° | 4.27 to 4.20 | 105 or more and 150 or less | 110 or more and 130 or less |
| 25.13° to 25.32° | 3.54 to 3.51 | 41 or more and 60 or less | 41 or more and 50 or less |

*The relative intensity represents an intensity relative to the peak intensity at 2θ = 9.55° to 9.77°.

In an example of the embodiment, preferably, an XRD pattern of the metal-containing CHA-type zeolite has at least XRD peaks shown in the table below.

TABLE 5

| 2θ | d-value (Å) | Relative intensity* Preferred value | More preferred value |
|---|---|---|---|
| 9.44° to 9.88° | 9.36 to 8.94 | 55 or more and 95 or less | 70 or more and 90 or less |
| 16.03° to 16.55° | 5.52 to 5.35 | 10 or more and 50 or less | 20 or more and 31 or less |
| 17.81° to 18.24° | 4.98 to 4.86 | 10 or more and 50 or less | 20 or more and 40 or less |
| 20.62° to 21.30° | 4.30 to 4.17 | 100 | 100 |
| 25.02° to 25.50° | 3.56 to 3.49 | 10 or more and 50 or less | 10 or more and 38 or less |

*The relative intensity represents an intensity relative to the peak intensity at 2θ = 20.62° to 21.30°.

Preferably, in the metal-containing CHA-type zeolite of the embodiment, the full-width at half maximum (hereinafter also referred to as "FWHM") of the peak at 2θ=9.44° to 9.88° is 0.150° or more and 0.200° or less, and the FWHM of the peak at 2θ=20.62° to 21.30° is 0.170° or more and 0.250° or less.

Preferably, a molar ratio of silica to alumina (hereinafter also referred to as "$SiO_2/Al_2O_3$" or "SAR") is 10.0 or more. The SAR is preferably 12.0 or more, more preferably 15.0 or more, and more preferably 20.0 or more. Furthermore, the SAR is 55.0 or less, preferably 40.0 or less, more preferably 31.5 or less, more preferably 30.0 or less, and more preferably 28.0 or less.

Preferably, the range of the SAR is 10.0 or more and 55.0 or less, preferably 10.0 or more and 40.0 or less, more preferably 10.0 or more and 31.5 or less, more preferably 12.0 or more and 30.0 or less, more preferably 12.0 or more and 28.0 or less, and more preferably 12.0 or more and 25.0 or less.

Another preferred range of the SAR is 18.0 or more and 50.0 or less, preferably 20.0 or more and 45.0 or less, more preferably 20.0 or more and 35.0 or less, and more preferably 23.0 or more and 31.5 or less.

Preferably, the metal-containing CHA-type zeolite of the embodiment contains a metal as a metal ion at least other than in the framework structure of the CHA structure, for example, on a surface, in a pore, or in an ion-exchange site of the CHA-type zeolite. The metal is preferably contained in a pore.

Preferably, the metal contained in the metal-containing CHA-type zeolite of the embodiment is a transition metal, preferably at least one of iron or copper, and more preferably copper.

Preferably, a molar ratio of the metal to aluminum (hereinafter also referred to as "M/Al") is 0.10 or more and 1.00 or less. The M/Al is preferably 0.20 or more and 0.80 or less.

Preferably, when the metal is copper, a molar ratio of copper to aluminum (hereinafter also referred to as "Cu/Al") is 0.10 or more and 0.50 or less, more preferably 0.20 or more and 0.47 or less, and more preferably 0.25 or more and 0.45 or less.

Preferably, when the metal is iron, a molar ratio of iron to aluminum (hereinafter also referred to as "Fe/Al") is 0.10 or more and 0.50 or less, preferably 0.15 or more and 0.35 or less, and more preferably 0.20 or more and 0.33 or less.

Figure 2A:
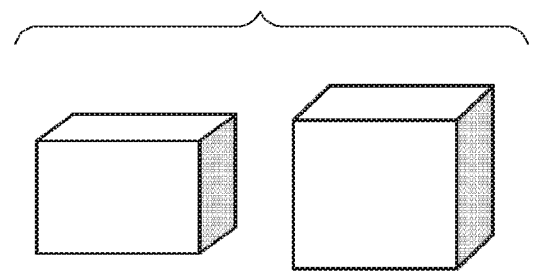
FIG. 2A is a schematic view illustrating primary crystal particles of a CHA-type zeolite.

Preferably, the metal-containing CHA-type zeolite of the embodiment includes crystal particles formed by growing individual primary particles while maintaining the crystalline form of the CHA structure (hereinafter also referred to as "primary crystal particles"). The primary crystal particles are crystal particles having the same shape as the crystallite of the CHA structure as illustrated in the schematic view of FIG. 2A The primary crystal particles are observed as crystal particles having at least one of a hexahedral shape or a substantially hexahedral shape, and further, a cubic shape or a substantially cubic shape, in electron microscopic observation.

Figure 2B:
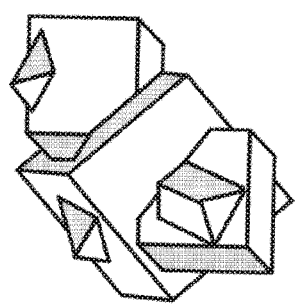
FIG. 2B is a schematic view illustrating an aggregate crystal particle of a CHA-type zeolite.

The metal-containing CHA-type zeolite of the embodiment is preferably formed of the primary crystal particles. However, the metal-containing CHA-type zeolite of the embodiment may include crystal particles formed of aggregate particles (aggregates) each formed by chemical bonding of a plurality of primary particles (hereinafter also referred to as "aggregate crystal particles"). An aggregate crystal particle may be identified as a crystal particle including part of a cube, in electron microscopic observation. However, an aggregate crystal particle includes a plurality of crystals that are irregularly chemically bonded together. An aggregate crystal particle is a crystal particle having a shape different from a primary crystal particle in terms of an independent particle and has a form different from the CHA structure in terms of individual particles, as illustrated in the schematic view of FIG. 2B. An aggregate crystal particle is observed as a crystal particle having a polycrystalline shape such as a twin-crystal shape, a polyhedral shape, or an irregular shape, in electron microscopic observation. When physical force such as crushing force is applied to aggregate crystal particles, crystals of the aggregate crystal particles are broken. Primary crystal particles having a hexahedral shape or a substantially hexahedral shape cannot be separated from the aggregate crystal particles that are once formed.

The primary crystal particles and the aggregate crystal particles may be agglomerated by physical force, such as the van der Waals force, to form an agglomerate particle (agglomerate), so-called a secondary particle. Unlike chemical bonding, individual primary particles that form the agglomerate can be separated from each other by disintegration or crushing, in some cases of agglomeration.

Preferably, the metal-containing CHA-type zeolite of the embodiment has a D50 in the range of 1 to 10 µm and more preferably 2 to 9 µm in a volume-based particle size distribution. The D50 refers to a particle size corresponding to a cumulative volume of 50% in the volume-based particle size distribution.

Measurement conditions for the volume-based particle size distribution may be the conditions described below.
Measuring method: Laser diffraction/scattering method
Refractive index: Measurement powder 1.66, Dispersion medium 1.33
Measurement sample: Slurry containing 1% by weight of measurement powder and 99% by weight of dispersion medium
Dispersion medium: Pure water
Pretreatment condition: The measurement sample (slurry) is treated with an ultrasonic homogenizer for 2 minutes.

The metal-containing CHA-type zeolite of the embodiment can be used as a catalyst. The metal-containing CHA-type zeolite of the embodiment is suitable for use in a method for reducing nitrogen oxides, the method including using the metal-containing CHA-type zeolite. Preferably, the metal-containing CHA-type zeolite of the embodiment can be used as a catalyst for reduction of nitrogen oxides, preferably used as a catalyst for selective reduction of nitrogen oxides, and more preferably used as a catalyst for selective reduction of nitrogen oxides where urea is used as a reducing agent.

A catalyst containing the metal-containing CHA-type zeolite of the embodiment (hereinafter also referred to as a "catalyst of the embodiment") can be used in the form of a powder or a molded body. A catalyst member may be formed by coating or wash-coating a substrate, such as a honeycomb, with the catalyst when the catalyst of the embodiment is used in the form of a powder. The catalyst may be formed to have at least one shape selected from the group consisting of a spherical shape, a substantially spherical shape, an elliptical shape, a disc shape, a columnar shape, a polyhedral shape, an irregular shape and a petal shape, or another shape suitable for use when the catalyst of the embodiment is used in the form of a molded body.

A molded body may contain at least one clay selected from the group consisting of silica, alumina, kaolin, attapulgite, montmorillonite, bentonite, allophane and sepiolite in addition to the catalyst of the embodiment when the catalyst of the embodiment is used in the form of a molded body.

In particular, the catalyst of the embodiment is preferably used as a catalyst for reduction of nitrogen oxides, and more preferably used as a catalyst for reduction of nitrogen oxides in exhaust gas of internal combustion engines.

The reduction of nitrogen oxides is performed by bringing a nitrogen oxide-containing gas into contact with the catalyst of the embodiment. The space velocity when the nitrogen oxide-containing gas is brought into contact with the catalyst of the embodiment is not particularly limited. The space velocity may be 500 to 500,000 hour$^{-1}$, and further, 2,000 to 300,000 hour$^{-1}$ on a volume basis.

The nitrogen oxide to be reduced by the catalyst of the embodiment may be, for example, at least one selected from the group consisting of nitrogen monoxide, nitrogen dioxide, dinitrogen trioxide, dinitrogen tetroxide and dinitrogen monoxide, and further, at least one selected from the group consisting of nitrogen monoxide, nitrogen dioxide and dinitrogen monoxide.

The nitrogen oxide-containing gas may contain a component other than nitrogen oxides. An example of the nitrogen oxide-containing gas is gas containing nitrogen oxides and at least one selected from the group consisting of hydrocarbons, carbon monoxide, carbon dioxide, hydrogen, nitrogen, oxygen, sulfur oxides and water. Examples of the specific nitrogen oxide-containing gas include exhaust gas of internal combustion engines, and further, exhaust gas of, for example, diesel automobiles, gasoline automobiles, boilers and gas turbines.

A method for reducing nitrogen oxides using the catalyst of the embodiment is particularly preferably a method for reducing nitrogen oxides in the presence of a reducing agent. The reducing agent may include at least one selected from the group consisting of ammonia, urea, organic amines, hydrocarbons, alcohols, ketones, carbon monoxide and hydrogen. The reducing agent more preferably includes at least one selected from the group consisting of ammonia, urea and organic amines. When the nitrogen oxide-containing gas contains a reducing substance, for example, at least one selected from the group consisting of hydrocarbons, carbon monoxide, and hydrogen, the reducing substance can also be considered as a reducing agent.

Next, a method for producing a metal-containing CHA-type zeolite of the embodiment will be described.

A metal-containing CHA-type zeolite of the embodiment can be obtained by a method for producing a metal-containing CHA-type zeolite, the method including a metal incorporation step of mixing a metal source and a CHA-type zeolite in which a ratio of a maximum intensity of an absorption peak in a range of 3665 $cm^{-1}$ or more and 3750 $cm^{-1}$ or less to a maximum intensity of an absorption peak in a range of 1800 $cm^{-1}$ or more and 1930 $cm^{-1}$ or less is less than 1.5 in an IR spectrum.

Any mixing method may be employed in the metal incorporation step as long as a metal is contained in at least any of ion-exchange sites or pores of the CHA-type zeolite. A specific mixing method may be at least one selected from the group consisting of an ion exchange method, an evaporation drying method and an incipient wetness impregnation. The impregnation supporting method, and further, a method including mixing an aqueous solution containing a metal source and a CHA-type zeolite are preferred.

The metal source used in the metal incorporation step is at least one of a metal or a metal compound and is preferably a transition metal or a transition metal compound. Preferably, the metal source includes at least one selected from the group consisting of oxides, hydroxides, oxyhydroxides, sulfates, nitrates, chlorides and acetates of transition metals. More preferably, the metal source includes at least one selected from the group consisting of sulfates, nitrates, chlorides and acetates of transition metals. More preferably, the metal source includes nitrates of transition metals.

Preferably, the metal contained in the metal source is at least one of iron or copper, and more preferably copper.

The CHA-type zeolite used in the metal incorporation step (hereinafter also referred to as a "source-CHA") is a CHA-type zeolite in which a ratio of a maximum intensity of an absorption peak in a range of 3665 $cm^{-1}$ or more and 3750 $cm^{-1}$ or less to a maximum intensity of an absorption peak in a range of 1800 $cm^{-1}$ or more and 1930 $cm^{-1}$ or less is less than 1.5 in an IR spectrum.

The shape of the IR spectrum of the source-CHA, and the number and the intensities of absorption peaks included in the IR spectrum are not particularly limited.

Preferably, in an IR spectrum of the source-CHA, a ratio of a maximum intensity of an absorption peak in a range of 3665 $cm^{-1}$ or more and 3750 $cm^{-1}$ or less (hereinafter also referred to as "Peak-2'") to a maximum intensity of an absorption peak in a range of 1800 $cm^{-1}$ or more and 1930 $cm^{-1}$ or less (hereinafter also referred to as "Peak-1'") is less than 1.5, preferably 1.0 or less, and more preferably 0.5 or less. The ratio of the maximum intensity of Peak-2' to the maximum intensity of Peak-1' (hereinafter also referred to as a "ratio P2'/P1'") becomes minimum when the source-CHA does not have Peak-2', and the value of the ratio P2'/P1' is 0 (zero).

Preferably, the ratio P2'/P1' is 0 or more and less than 1.5, more preferably 0 or more and 1.0 or less, more preferably 0 or more and 0.5 or less, more preferably more than 0 and 0.5 or less, and more preferably more than 0 and 0.2 or less.

Preferably, in the IR spectrum of the source-CHA, a ratio of a maximum intensity of an absorption peak in a range of 3450 $cm^{-1}$ or more and 3545 $cm^{-1}$ or less (hereinafter also referred to as "Peak-3'") to the maximum intensity of Peak-1' is less than 1.6. The ratio of the maximum intensity of Peak-3' to the maximum intensity of Peak-1' (hereinafter also referred to as a "ratio P3'/P1'") becomes minimum when the source-CHA does not have Peak-3', and the value of the ratio P3'/P1' is 0 (zero).

Preferably, the ratio P3'/P1' is 0 or more and less than 1.6, further, 0 or more and 1.5 or less, further, 0 or more and 1.0 or less, further, 0 or more and 0.5 or less, and further, 0 or more and 0.05 or less.

Preferably, in the IR spectrum of the source-CHA, a ratio of a maximum intensity of an absorption peak in a range of 3550 $cm^{-1}$ or more and 3670 $cm^{-1}$ or less (hereinafter also referred to as "Peak-4'") to the maximum intensity of Peak-1' is less than 13.0. The ratio of the maximum intensity of Peak-4' to the maximum intensity of Peak-1' (hereinafter also referred to as a "ratio P4'/P1'") becomes minimum when the source-CHA does not have Peak-4', and the value of the ratio P4'/P1' is 0 (zero).

Preferably, the ratio P4'/P1' is 0 or more and less than 13.0, preferably 0 or more and less than 3.0, more preferably 0 or more and 1.0 or less, more preferably 0 or more and 0.5 or less, more preferably 0 or more and 0.1 or less, and more preferably more than 0 and 0.1 or less.

Preferably, Peak-1' to Peak-4' are absorption peaks in any of the ranges described below.

Peak-1': 1800 $cm^{-1}$ or more and 1930 $cm^{-1}$ or less,
preferably 1800 $cm^{-1}$ or more and 1860 $cm^{-1}$ or less, and
more preferably 1820 $cm^{-1}$ or more and 1858 $cm^{-1}$ or less Peak-2': 3665 $cm^{-1}$ or more and 3750 $cm^{-1}$ or less,
preferably 3665 $cm^{-1}$ or more and 3740 $cm^{-1}$ or less,
preferably 3665 $cm^{-1}$ or more and 3735 $cm^{-1}$ or less,
preferably 3705 $cm^{-1}$ or more and 3735 $cm^{-1}$ or less,
more preferably 3710 $cm^{-1}$ or more and 3735 $cm^{-1}$ or less, and
more preferably 3710 $cm^{-1}$ or more and 3730 $cm^{-1}$ or less Peak-3': 3450 $cm^{-1}$ or more and 3545 $cm^{-1}$ or less,
preferably 3450 $cm^{-1}$ or more and 3495 $cm^{-1}$ or less, and
more preferably 3450 $cm^{-1}$ or more and 3480 $cm^{-1}$ or less Peak-4': 3550 $cm^{-1}$ or more and 3670 $cm^{-1}$ or less,
preferably 3550 $cm^{-1}$ or more and 3660 $cm^{-1}$ or less,
more preferably 3560 $cm^{-1}$ or more and 3615 $cm^{-1}$ or less, and
more preferably 3560 $cm^{-1}$ or more and 3600 $cm^{-1}$ or less Preferably, an XRD pattern of the source-CHA has at least XRD peaks shown in the table below.

TABLE 6

| 2θ | d-value (Å) | Relative intensity* Preferred value | Relative intensity* More preferred value |
|---|---|---|---|
| 9.44° to 9.88° | 9.36 to 8.94 | 100 | 100 |
| 16.03° to 16.55° | 5.52 to 5.35 | 11 or more and 34 or less | 15 or more and 30 or less |
| 17.81° to 18.24° | 4.98 to 4.86 | 10 or more and 50 or less | 10 or more and 28 or less |
| 20.62° to 21.30° | 4.30 to 4.17 | 61 or more and 98 or less | 70 or more and 90 or less |
| 25.02° to 25.50° | 3.56 to 3.49 | 20 or more and 60 or less | 20 or more and 37 or less |

*The relative intensity represents an intensity relative to the peak intensity at 2θ = 9.44° to 9.88°.

More preferably, an XRD pattern of the source-CHA has at least XRD peaks shown in the table below.

TABLE 7

| 2θ | d-value (Å) | Relative intensity* Preferred value | Relative intensity* More preferred value |
|---|---|---|---|
| 9.55° to 9.77° | 9.25 to 9.05 | 100 | 100 |
| 16.16° to 16.42° | 5.48 to 5.39 | 11 or more and 34 or less | 15 or more and 30 or less |
| 17.89° to 18.05° | 4.95 to 4.91 | 10 or more and 50 or less | 10 or more and 28 or less |
| 20.79° to 21.13° | 4.27 to 4.20 | 61 or more and 98 or less | 70 or more and 90 or less |
| 25.13° to 25.32° | 3.54 to 3.51 | 20 or more and 60 or less | 20 or more and 37 or less |

*The relative intensity represents an intensity relative to the peak intensity at 2θ = 9.55° to 9.77°.

In the embodiment, preferably, an XRD pattern of the source-CHA has at least XRD peaks shown in the table below.

TABLE 8

| 2θ | d-value (Å) | Relative intensity* Preferred value | Relative intensity* More preferred value |
|---|---|---|---|
| 9.44° to 9.88° | 9.36 to 8.94 | 102 or more and 150 or less | 110 or more and 140 or less |
| 16.03° to 16.55° | 5.52 to 5.35 | 10 or more and 50 or less | 20 or more and 40 or less |
| 17.81° to 18.24° | 4.98 to 4.86 | 10 or more and 50 or less | 20 or more and 40 or less |
| 20.62° to 21.30° | 4.30 to 4.17 | 100 | 100 |
| 25.02° to 25.50° | 3.56 to 3.49 | 10 or more and 50 or less | 10 or more and 38 or less |

*The relative intensity represents an intensity relative to the peak intensity at 2θ = 20.62° to 21.30°.

The XRD pattern and the IR spectrum of the source-CHA may vary depending on whether or not the source-CHA contains an organic structure-directing agent used in the production thereof and whether or not the source-CHA contains a metal. Accordingly, physical properties such as an XRD pattern and an IR spectrum may vary depending on the presence or absence of the organic structure-directing agent and the difference between the source-CHA and the metal-containing CHA-type zeolite. The above-described IR spectra and XRD patterns of the source-CHA are those in a state in which neither an organic structure-directing agent nor a metal to be incorporated in the metal incorporation step are contained.

Preferably, $SiO_2/Al_2O_3$ of the source-CHA is 10.0 or more. $SiO_2/Al_2O_3$ is preferably 12.0 or more, more preferably 15.0 or more, and more preferably 20.0 or more. Furthermore, $SiO_2/Al_2O_3$ is 55.0 or less, preferably 40.0 or less, more preferably 31.5 or less, more preferably 30.0 or less, and more preferably 28.0 or less.

Preferably, the range of $SiO_2/Al_2O_3$ is 10.0 or more and 55.0 or less, preferably 10.0 or more and 40.0 or less, more preferably 10.0 or more and 31.5 or less, more preferably 12.0 or more and 30.0 or less, more preferably 12.0 or more and 28.0 or less, and more preferably 12.0 or more and 25.0 or less.

Another preferred range of $SiO_2/Al_2O_3$ is 18.0 or more and 50.0 or less, preferably 20.0 or more and 45.0 or less, more preferably 20.0 or more and 35.0 or less, and more preferably 23.0 or more and 31.5 or less.

The source-CHA contains silanol groups in crystals thereof because the source-CHA is a realistic crystalline aluminosilicate. Preferably, a molar ratio of silanol groups to silicon of the source-CHA (hereinafter also referred to as a "ratio SiOH/Si") is $0.15 \times 10^{-2}$ or more and $1.80 \times 10^{-2}$ or less, preferably $0.15 \times 10^{-2}$ or more and $1.50 \times 10^{-2}$ or less, more preferably $0.15 \times 10^{-2}$ or more and $1.10 \times 10^{-2}$ or less, and more preferably $0.15 \times 10^{-2}$ or more and less than $1.00 \times 10^{-2}$. The content of silanol groups tends to increase with an increase in the amount of silicon in the framework structure. Therefore, high-silica zeolites tend to have a high content of silanol groups.

Preferably, $SiO_2/Al_2O_3$ and the ratio SiOH/Si of the source-CHA satisfy a certain relationship. More preferably, the source-CHA has any of the upper limits and lower limits of the ratio SiOH/Si in each of the ranges of $SiO_2/Al_2O_3$ shown in the table below.

TABLE 9

| | Ratio SiOH/Si ($\times 10^{-2}$) | |
|---|---|---|
| $SiO_2/Al_2O_3$ | Lower limit | Upper limit |
| 10.0 or more and less than 20.0 | 0.15 or more, 0.20 or more, or 0.30 or more | 0.50 or less or 0.40 or less |
| 20.0 or more and 35.0 or less | 0.15 or more, 0.40 or more, or 0.50 or more | 1.10 or less, or less than 1.00 |
| More than 35.0 and 45.0 or less | 0.15 or more, 0.60 or more, or 1.00 or more | 1.65 or less, 1.40 or less, or 1.30 or less |
| More than 45.0 and 55.0 or less | 0.15 or more, 0.60 or more, 1.00 or more, 1.20 or more, or 1.40 or more | 1.80 or less, or 1.75 or less |

The ratio SiOH/Si can be obtained from the amount of silanol obtained from a $^1H$ MAS NMR spectrum to the content of silicon of a CHA-type zeolite. The content of silicon of the CHA-type zeolite can be obtained by X-ray fluorescence analysis or another chemical composition analysis. An example of the method for measuring the content of silicon by X-ray fluorescence analysis is a calibration-curve method. A calibration curve used in the calibration-curve method may be prepared by measuring the intensity of an X-ray fluorescence peak corresponding to silicon (Si) in each of eight to fifteen silicon-containing compounds having known silicon contents and drawing a calibration curve between the intensity and the silicon content. The content of silicon of the CHA-type zeolite can be measured by measuring the intensity of an X-ray fluorescence peak corresponding to silicon (Si) in an X-ray fluorescence pattern of the CHA-type zeolite, which is a measurement sample, and by comparing the measured intensity with the calibration curve.

The amount of silanol obtained from a $^1H$ MAS NMR spectrum can be calculated by the calibration-curve method from a $^1H$ MAS NMR spectrum obtained by conducting a $^1H$ MAS NMR measurement of the CHA-type zeolite that has been subjected to dehydration treatment.

A more specific method for measuring the amount of silanol includes maintaining the CHA-type zeolite at 350° C. to 400° C. for 5±2 hours under vacuum evacuation to perform dehydration treatment, collecting and weighing the CHA-type zeolite after the dehydration treatment in a nitrogen atmosphere, and conducting a $^1H$ MAS NMR measurement of the CHA-type zeolite. The amount of silanol in the CHA-type zeolite is obtained by the calibration-curve method from an integrated intensity of a peak (peak at 2.0±0.5 ppm) attributable to a silanol group of a $^1$H MAS NMR spectrum obtained by the measurement.

Preferably, the source-CHA is a CHA-type zeolite selected from the group consisting of a CHA-type zeolite having a $SiO_2/Al_2O_3$ of 10.0 or more and less than 20.0 and a ratio SiOH/Si of $0.15\times10^{-2}$ or more and $0.50\times10^{-2}$ or less, a CHA-type zeolite having a $SiO_2/Al_2O_3$ of 20.0 or more and 35.0 or less and a ratio SiOH/Si of $0.15\times10^{-2}$ or more and $1.10\times10^{-2}$ or less, a CHA-type zeolite having a $SiO_2/Al_2O_3$ of more than 35.0 and 45.0 or less and a ratio SiOH/Si of $0.15\times10^{-2}$ or more and $1.65\times10^{-2}$ or less, and a CHA-type zeolite having a $SiO_2/Al_2O_3$ of more than 45.0 and 55.0 or less and a ratio SiOH/Si of $0.15\times10^{-2}$ or more and $1.80\times10^{-2}$ or less.

The type of cation of the source-CHA is preferably at least one of a proton or an ammonium.

Preferably, the source-CHA has high heat resistance, and breakdown of the framework structure, such as elimination of T atoms from the framework, is unlikely to proceed even after the source-CHA is exposed to a high-temperature atmosphere. An index of heat resistance of the source-CHA is a ratio $I_{1000}/I_{600}$ (hereinafter also referred to as a "ratio I") where $I_{600}$ represents an intensity of an XRD peak corresponding to 4.30 to 4.17 Å as a d-value of the source-CHA treated at 600° C. for 5 hours in air, and $I_{1000}$ represents an intensity of the XRD peak of the source-CHA treated at 1000° C. for 5 hours in air. The higher the ratio I, the higher heat resistance.

Preferably, the air in the above treatment is air having a low moisture content, more preferably air having a dew point of −20° C. or lower, and more preferably air having a dew point of −50° C. or lower.

For example, the ratio I of the source-CHA is 0.10 or more and less than 1.00, more preferably 0.30 or more and 0.95 or less, and more preferably 0.50 or more and 0.90 or less.

The production method of the embodiment may include, after the metal incorporation step, at least one of a washing step, a drying step, or an activation step.

In the washing step, any washing method may be employed as long as impurities and the like are removed. For example, after the metal incorporation step, the resulting metal-containing CHA-type zeolite may be washed with a sufficient amount of pure water.

In the drying step, any method may be employed as long as water adsorbed to the resulting metal-containing CHA-type zeolite can be removed. For example, the metal-containing CHA-type zeolite may be treated at 100° C. or higher and 200° C. or lower in air.

In the activation step, organic substances remaining in the metal-containing CHA-type zeolite are removed. An example of the activation method may include treating the metal-containing CHA-type zeolite at a temperature higher than 200° C. and 600° C. or lower in air.

Preferably, the source-CHA is a synthetic CHA-type zeolite. Hereinafter, a preferred method for producing a source-CHA will be described.

An example of a preferred method for producing a source-CHA (hereinafter also referred to as a "source-CHA production method") is a method for producing a CHA-type zeolite, the method including a crystallization step of crystallizing a composition containing an alumina source, a silica source, an alkali source, water and an N,N,N-trialkylcyclohexylammonium cation source represented by a general formula below:

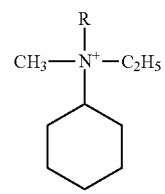

where R is a methyl group or an ethyl group, and preferably a methyl group.

An example of a particularly preferred source-CHA production method is a method for producing a CHA-type zeolite, the method including a crystallization step of crystallizing a composition containing an alumina source, a silica source, an alkali source, water and an N,N,N-dimethylethylcyclohexylammonium cation source (hereinafter also referred to as a "raw-material composition"), in which the alkali source includes at least sodium, and a molar ratio of sodium to silica in the composition is more than 0 and less than 0.1.

The N,N,N-dimethylethylcyclohexylammonium cation (hereinafter also referred to as "DMECHA$^+$") source is a compound containing DMECHA$^+$ and a compound including DMECHA$^+$ and a counter anion of DMECHA$^+$. DMECHA$^+$ is a quaternary ammonium cation represented by a general formula below and functions as an organic structure-directing agent (hereinafter also referred to as an "SDA") with which the CHA structure is directed.

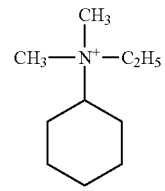

Specific examples of the N,N,N-dimethylethylcyclohexylammonium (hereinafter also referred to as "DMECHA") cation source include DMECHA salts. Preferably, the DMECHA cation source includes at least one selected from the group consisting of a hydroxide, a chloride, a bromide, an iodide, a carbonic acid monoester, a sulfuric acid monoester, a nitrate and a sulfate of DMECHA, more preferably at least one selected from the group consisting of a hydroxide, a chloride, a bromide, an iodide, a nitrate and a sulfate of DMECHA, still more preferably at least one selected from the group consisting of a hydroxide, a chloride, a bromide and an iodide of DMECHA, and still more preferably at least one selected from the group consisting of a hydroxide, a chloride and a bromide of DMECHA.

Preferably, the DMECHA cation source includes at least two selected from the group consisting of a hydroxide, a chloride, a bromide and an iodide of DMECHA and preferably includes dimethylethylcyclohexylammonium hydroxide (hereinafter also referred to as "DMECHAOH") and a dimethylethylcyclohexylammonium halide other than a fluoride. The dimethylethylcyclohexylammonium halide other than a fluoride includes at least one selected from the group consisting of dimethylethylcyclohexylammonium bromide (hereinafter also referred to as "DMECHABr"), dimethylethylcyclohexylammonium chloride (hereinafter also referred to as "DMECHACl") and dimethylethylcyclohexylammonium iodide (hereinafter also referred to as "DMECHAI"). Particularly preferred DMECHA cation source includes DMECHAOH and DMECHABr.

The raw-material composition contains DMECHA$^+$ as the SDA and may contain DMECHA$^+$ alone as the SDA. The raw-material composition may contain an organic structure-directing agent source other than DMECHA$^+$ (hereinafter also referred to as an "exSDA source") in an amount equal to or less than the amount of the DMECHA cation source, in order to further increase the directivity to the CHA structure.

Preferably, the exSDA source is a quaternary ammonium cation having a cyclic structure, and preferably a N,N,N-trimethyladamantaneammonium cation (hereinafter also referred to as "TMAdA$^+$"). Preferably, the exSDA source includes a compound containing TMAdA$^+$, more preferably at least one selected from the group consisting of a hydroxide, a chloride, a bromide, an iodide, a carbonic acid monoester, a sulfuric acid monoester, a nitrate and a sulfate of N,N,N-trimethyladamantaneammonium (hereinafter also referred to as "TMAdA"), more preferably at least one selected from the group consisting of a hydroxide, a chloride, a bromide, an iodide, a nitrate and a sulfate of TMAdA, and still more preferably at least one selected from the group consisting of a hydroxide, a chloride, a bromide and an iodide of TMAdA.

Preferably, the raw-material composition does not contain a quaternary ammonium cation that does not have a cyclic structure. More preferably, the raw-material composition does not contain a tetramethylammonium cation (hereinafter also referred to as "TMA$^+$").

The alumina source is alumina ($Al_2O_3$) or an aluminum compound serving as a precursor of alumina. For example, the alumina source includes at least one selected from the group consisting of alumina, aluminum sulfate, aluminum nitrate, sodium aluminate, aluminum hydroxide, aluminum chloride, amorphous aluminosilicates, metallic aluminum and aluminum alkoxides.

The silica source is silica ($SiO_2$) or a silicon compound serving as a precursor of silica. For example, the silica source includes at least one selected from the group consisting of colloidal silica, amorphous silica, sodium silicate, tetraethoxysilane, tetraethyl orthosilicate, precipitated silica, fumed silica and amorphous aluminosilicates.

Amorphous aluminosilicates are compounds functioning as the alumina source and the silica source (hereinafter also referred to as a "silica-alumina source"). Therefore, the raw-material composition preferably contains an amorphous aluminosilicate as the silica-alumina source.

The alkali source includes at least sodium, preferably includes sodium and at least one selected from the group consisting of lithium, potassium, rubidium and cesium, more preferably includes sodium and at least one selected from the group consisting of potassium, rubidium and cesium, and more preferably includes potassium and sodium.

Preferably, the alkali source including sodium (hereinafter also referred to as a "sodium source") is at least one selected from the group consisting of a hydroxide, a chloride, a bromide, and an iodide that contain sodium, preferably at least one selected from the group consisting of a hydroxide, a chloride, a bromide and an iodide of sodium, and more preferably at least one selected from the group consisting of a hydroxide, a chloride, and a bromide of sodium, and still more preferably a hydroxide of sodium.

Preferably, the alkali source including an alkali metal other than sodium is at least one selected from the group consisting of a hydroxide, a chloride, a bromide, and an iodide of any one selected from the group consisting of lithium, potassium, rubidium and cesium, more preferably at least one selected from the group consisting of a hydroxide, a chloride, and a bromide of any one selected from the group consisting of lithium, potassium, rubidium and cesium, and more preferably a hydroxide of any one selected from the group consisting of lithium, potassium, rubidium and cesium.

Preferably, the alkali source includes at least one selected from the group consisting of a hydroxide, a chloride, a bromide, and an iodide of sodium and at least one selected from the group consisting of a hydroxide, a chloride, a bromide, and an iodide of potassium, and more preferably includes sodium hydroxide and potassium hydroxide.

When other raw materials such as the alumina source, the silica source, and the DMECHA cation source contain an alkali metal, the alkali metal contained in the raw materials also functions as the alkali source.

Examples of the water contained in the raw-material composition include deionized water and pure water. When other raw materials such as the alumina source, the silica source, the DMECHA cation source, and the alkali source are each an aqueous material, a hydrate, or an aqueous solution, the water contained in the raw materials is also considered as water contained in the raw-material composition.

Preferably, the raw-material composition does not contain a fluorine-containing compound because fluorine (F) has particularly high corrosiveness. Preferably, the raw-material composition does not contain fluorine. The raw-material composition preferably has a fluorine content of 1 ppm or less.

Examples of the fluorine-containing compound include hydrogen fluoride, quaternary ammonium fluorides, and alkali metal fluorides. An example of the quaternary ammonium fluoride is dimethylethylcyclohexylammonium fluoride (hereinafter also referred to as "DMECHAF"). Examples of the alkali metal fluorides include sodium fluoride and potassium fluoride.

A molar ratio of DMECHA$^+$ to silica (hereinafter also referred to as "DMECHA/$SiO_2$") in the raw-material composition is 0.03 or more, preferably 0.04 or more, and more preferably 0.06 or more. It is not necessary to increase the amount of SDA to a level more than necessary. A ratio SDA/$SiO_2$ is 0.30 or less, preferably 0.20 or less, more preferably 0.15 or less, and more preferably 0.10 or less.

Preferably, the range of DMECHA/$SiO_2$ is 0.03 or more and 0.3 or less, preferably 0.03 or more and 0.2 or less, more preferably 0.04 or more and 0.15 or less, more preferably 0.04 or more and 0.12 or less, more preferably 0.06 or more and 0.12 or less, and 0.06 or more and 0.10 or less.

Preferably, a molar ratio of TMAdA$^+$ to silica (hereinafter also referred to as "TMAdA/$SiO_2$") in the raw-material composition is 0.1 or less, more preferably 0.05 or less, more preferably 0.02 or less, and more preferably 0.01 or less.

Preferably, a molar ratio of silica to alumina ($SiO_2/Al_2O_3$) in the raw-material composition is 10 or more and 100 or less, preferably 10 or more and 60 or less, more preferably 10 or more and 40 or less, and more preferably 10 or more and 35 or less.

A molar ratio of sodium to silica (hereinafter also referred to as "Na/$SiO_2$") in the raw-material composition exceeds 0 and less than 0.10, preferably exceeds 0 and 0.095 or less, more preferably exceeds 0 and 0.09 or less, more preferably 0.02 or more and 0.09 or less, and more preferably 0.02 or more and 0.08 or less. When Na/$SiO_2$ is 0.10 or more, it takes a long time to perform the crystallization step in order that a CHA-type zeolite is crystallized as a single crystalline phase.

When the raw-material composition contains at least one selected from the group consisting of lithium, potassium, rubidium and cesium (hereinafter also referred to as "$M_{add}$"), preferably, a molar ratio of the at least one selected from the group consisting of lithium, potassium, rubidium and cesium to silica in the raw-material composition (hereinafter also referred to as "$M_{add}/SiO_2$") exceeds 0 and less than 0.15, preferably exceeds 0.02 and less than 0.15, and more preferably 0.03 or more and 0.13 or less.

When the raw-material composition contains sodium and potassium as alkali metals, a molar ratio of sodium to potassium (hereinafter also referred to as "Na/K") may be 0.05 or more and 20.0 or less, further, 0.065 or more and 5.0 or less, and further, 0.1 or more and 2.0 or less.

Preferably, a molar ratio of a total of the alkali metals to silica (hereinafter also referred to as "$M_{total}/SiO_2$") in the raw-material composition is 0.10 or more and 0.50 or less, more preferably 0.10 or more and 0.30 or less, more preferably 0.10 or more and 0.15 or less, and more preferably 0.10 or more and 0.13 or less.

Preferably, a molar ratio of water ($H_2O$) to silica (hereinafter also referred to as "$H_2O/SiO_2$") in the raw-material composition is 5.0 or more and 50.0 or less, preferably 6.5 or more and 20.0 or less, more preferably 10.0 or more and 20.0 or less, more preferably 10.0 or more and 19.0 or less, and more preferably 11.0 or more and 18.5 or less.

Preferably, a molar ratio of hydroxide anion ($OH^-$) to silica (hereinafter also referred to as "$OH/SiO_2$") in the raw-material composition is 0.05 or more and 1.0 or less, and preferably 0.1 or more and 0.5 or less. More preferably, $OH/SiO_2$ is 0.30 or less, still more preferably 0.24 or less, still more preferably 0.20 or less, and still more preferably 0.17 or less. Still more preferably, $OH/SiO_2$ is 0.15 or less.

A CHA-type zeolite is obtained with a high yield within a sufficiently short time even when the raw-material composition does not contain a seed crystal in the source-CHA production method, a. Accordingly, the raw-material composition may contain no seed crystal, that is, the content of a seed crystal may be 0% by weight.

However, the raw-material composition may contain a seed crystal. The seed crystal is preferably a CHA-type zeolite, and further, SSZ-13.

When the raw-material composition contains a seed crystal, the content (% by weight) of the seed crystal satisfies the following inequality:

0% by weight<{(w3+w4)/(w1+w2)}×100≤30% by weight

In the above inequality, w1 represents a weight of Al in the raw-material composition in terms of $Al_2O_3$, w2 represents a weight of Si in the raw-material composition in terms of $SiO_2$, w3 represents a weight of Al in the seed crystal in terms of $Al_2O_3$, and w4 represents a weight of Si in the seed crystal in terms of $SiO_2$.

When the raw-material composition contains a seed crystal, the content of the seed crystal preferably satisfies the following inequality:

0% by weight<{(w3+w4)/(w1+w2)}×100≤5% by weight

Further, the content of the seed crystal preferably satisfies the following inequality:

1.5% by weight≤{(w3+w4)/(w1+w2)}×100≤5% by weight

Preferred compositions of the raw-material composition may be as follows.

$SiO_2/Al_2O_3$=10 or more and 100 or less, and preferably 10 or more and 60 or less
$DMECHA/SiO_2$=0.03 or more and 0.30 or less, and preferably 0.06 or more and 0.15 or less
$Na/SiO_2$=more than 0 and 0.095 or less, preferably, more than 0 and 0.09 or less, and more preferably 0.02 or more and 0.09 or less
$M_{total}/SiO_2$=0.05 or more and 1.0 or less, and preferably 0.10 or more and 0.30 or less
$OH/SiO_2$=0.05 or more and 1.0 or less, and preferably 0.10 or more and 0.50 or less,
$H_2O/SiO_2$=5.0 or more and 50.0 or less, preferably 8.0 or more and 20.0 or less, and more preferably 10.0 or more and 20.0 or less
Seed crystal=0.0% by weight or more and 30.0% by weight or less,
  preferably 0.0% by weight or more and 5.0% by weight or less,
  more preferably 1.0% by weight or more and 5.0% by weight or less, and
  more preferably 1.2% by weight or more and 5.0% by weight or less In the above compositions, the alkali metals in $M_{total}$ are Na and K.

The method for crystalizing the raw-material composition is preferably hydrothermal synthesis. The hydrothermal synthesis is performed by charging the raw-material composition in an airtight container, hermetically sealing the container, and heating the container. The crystallization may be performed either in a stationary state or under stirring.

The crystallization temperature is preferably 130° C. or higher and 200° C. or lower, more preferably 140° C. or higher and 180° C. or lower, and more preferably 140° C. or higher and 170° C. or lower. Even when the crystallization temperature is 130° C. or higher and 160° C. or lower, and preferably 130° C. or higher and 155° C. or lower, a CHA-type zeolite with high crystallinity can be obtained within 48 hours.

The crystallization temperature may be changed during crystallization within the above ranges. For example, crystallization may be started at 130° C. or higher and 160° C. or lower, and the crystallization temperature may then be changed to higher than 160° C. and 200° C. or lower to perform crystallization.

The crystallization time refers to a time taken for a CHA-type zeolite to be crystalized from a raw-material composition and depends on the crystallization temperature. With an increase in the crystallization temperature, the crystallization time tends to become short. The crystallization time in the crystallization step may be 5 hours or more, further, 10 hours or more, and further, 24 hours (one day) or more. Preferably, the crystallization time is 5 hours or more and less than 72 hours (three days), and further, 5 hours or more and 50 hours or less.

Preferably, the source-CHA production method includes, after the crystallization step, at least one of a washing step, a drying step, or an ion exchange step.

In the washing step, a CHA-type zeolite after crystallization and a liquid phase are subjected to solid-liquid separation. In the washing step, solid-liquid separation is performed by a known method, and a CHA-type zeolite obtained as a solid phase is washed with deionized water.

In the drying step, water is removed from the CHA-type zeolite after the crystallization step or the washing step. The conditions for the drying step are not particularly limited.

For example, the CHA-type zeolite after the crystallization step or the washing step is allowed to stand in air at 50° C. or higher and 150° C. or lower for two hours or more.

In some cases, the CHA-type zeolite after crystallization has metal ions, such as alkali metal ions, on ion-exchange sites thereof. In the ion exchange step, the metal ions are ion-exchanged with non-metallic cations, such as an ammonium ion ($NH_4^+$) and a proton ($H^+$). The ion exchange with an ammonium ion may be performed by mixing a CHA-type zeolite with an aqueous solution of ammonium chloride, and stirring the resulting mixture. The ion exchange with a proton may be performed by subjecting a CHA-type zeolite to ion exchange with an ammonium ion, and calcining the resulting CHA-type zeolite.

The source-CHA production method can provide a CHA-type zeolite that contains neither a zeolite having a structure other than the CHA structure nor an amorphous aluminosilicate, that is, a single-phase CHA-type zeolite.

A CHA-type zeolite can be obtained with a sufficiently high yield suitable for industrial production in the source-CHA production method.

The yield of the zeolite in the source-CHA production method can be obtained from a ratio (%) of $SiO_2/Al_2O_3$ of the product obtained after crystallization to $SiO_2/Al_2O_3$ of the raw-material composition.

The yield of the zeolite in the source-CHA production method is 70% or more, further, 80% or more, and further, 90% or more. The source-CHA production method is particularly suitable as a method for industrially producing a CHA-type zeolite because such a high yield is achieved.

The source-CHA production method can be used as a method for producing a CHA-type zeolite and is applicable to a method for producing a CHA-type zeolite on a large scale, in particular, for example, a method for industrially producing a CHA-type zeolite. In particular, the source-CHA production method can be used as a method for industrially producing a CHA-type zeolite for a catalyst support or a CHA-type zeolite for an adsorbent.

EXAMPLES

Hereinafter, the embodiment will be described more specifically on the basis of Examples and Comparative Examples. However, the embodiment is not limited to the Examples described below. Evaluation methods and evaluation conditions will be described below.

IR Spectrum

An IR spectrum was measured under the conditions described below by using an FT-IR spectrometer (apparatus name: 660-IR available from Varian, Inc.) with a heating diffuse reflection device (device name: ST900° C. heating diffuse reflection device, available from ST Japan Inc.).

Measuring method: Diffuse reflectance method

Pretreatment: A sample was maintained under vacuum evacuation at 300° C. for three hours, the temperature was decreased to room temperature, and then measurement was performed.

Measurement wavenumber range: 400 to 4000 $cm^{-1}$

Resolution: 4 $cm^{-1}$

Number of acquisitions: 128 times

Identification of Crystal

An XRD measurement of a sample was conducted by using a powder X-ray diffractometer (apparatus name: Ultima IV, available from Rigaku Corporation). Measurement conditions are as follows.

Radiation source: CuKα rays (λ=1.5405 Å)

Measurement range: 2θ=5° to 43°

The structure of the sample was identified by comparing the obtained XRD pattern with the XRD pattern of a CHA-type zeolite shown in Table 2 of U.S. Pat. No. 4,544,538.

Ratio I

A crystalized CHA-type zeolite was subjected to heat treatment in air at 600° C., subjected to ion exchange with an aqueous solution of ammonium chloride, and then dried in air at 110° C. for 3 hours.

The CHA-type zeolite after drying was divided into two parts. One of the parts was heat-treated at 600° C., and the other part was heat-treated at 1000° C. The heat treatment conditions are described below.

Atmosphere: In air with a dew point of −50° C.

Heat treatment time: 5 hours

XRD patterns of the CHA-type zeolites after the heat treatment were measured by the same method as that used in the identification of crystals. The intensities of XRD peaks corresponding 4.30 to 4.17 Å (2θ=20.62° to 21.30°) as a d-value and the ratio I were determined.

Chemical Composition Analysis

A sample was dissolved in a mixed aqueous solution of hydrofluoric acid and nitric acid to prepare a sample solution. The sample solution was analyzed by inductively coupled plasma atomic emission spectrometry (ICP-AES) by using an ICP spectrometer (apparatus name: OPTIMA 5300DV, available from PerkinElmer Co., Ltd.). The value of $SiO_2/Al_2O_3$ of the sample was obtained from measured values of Si and Al.

Yield of Zeolite

Regarding each of the raw-material composition and the crystalized product, $SiO_2/Al_2O_3$ was obtained by the chemical composition analysis. A ratio of $SiO_2/Al_2O_3$ of the crystalized product to $SiO_2/Al_2O_3$ of the raw-material composition was determined, and the ratio was defined as a yield (%) of a zeolite.

Content of Silanol Group

The content of silanol groups of a CHA-type zeolite was measured by $^1H$ MAS NMR spectroscopy.

Prior to the measurement, a pretreatment was conducted by maintaining a sample under vacuum evacuation at 400° C. for 5 hours to dehydrate the sample. After the pretreatment, the sample cooled to room temperature was collected and weighed in a nitrogen atmosphere. A typical NMR spectrometer (apparatus name: VXR-300S, available from Varian, Inc.) was used. The measurement conditions are as follows.

Resonance frequency: 300.0 MHz

Pulse width: π/2

Measurement waiting time: 10 seconds

Number of acquisitions: 32 times

Rotational frequency: 4 kHz

Shift standard: TMS

A peak at 2.0±0.5 ppm in the obtained $^1H$ MAS NMR spectrum was determined as a peak attributable to a silanol group. The peak was subjected to waveform separation, and the integrated intensity of the peak was determined. The amount of silanol in the sample was obtained from the integrated intensity by a calibration-curve method.

Ratio SiOH/Si

A ratio of the content (mol/g) of silanol groups in the CHA-type zeolite measured by $^1H$ MAS NMR to the content (mol/g) of silicon in the CHA-type zeolite obtained by X-ray fluorescence analysis was determined. This ratio was defined as a ratio SiOH/Si.

Synthesis Example 1 (Synthesis of DMECHABr)

In a recovery flask, 50.0 g of N,N-dimethylcyclohexylamine, 42.8 g of ethyl bromide, and 100 mL of ethanol were charged, and the resulting mixture was allowed to react at 60° C. for 3 hours. After the completion of the reaction, unreacted products and the solvent were distilled off under a reduced pressure at 70° C. to obtain N,N,N-dimethylethylcyclohexylammonium bromide (DMECHABr). The DMECHABr was dissolved in deionized water to prepare a 25.0 wt % aqueous DMECHABr solution.

Synthesis Example 2 (Synthesis of DMECHAOH)

In 180.0 g of deionized water, 20.0 g of DMECHABr obtained in Synthesis Example 1 was dissolved. Ion exchange was performed by passing the resulting aqueous solution through a column filled with an anion-exchange resin (product name: DIAION SA-10A, available from Mitsubishi Chemical Corporation) to obtain an aqueous solution of N,N,N-dimethylethylcyclohexylammonium hydroxide (DMECHAOH). The aqueous solution was concentrated at 50° C. with a rotary evaporator to prepare a 25 wt % aqueous DMECHAOH solution.

Example 1

The 25 wt % aqueous DMECHABr solution, the 25 wt % aqueous DMECHAOH solution, a 48 wt % aqueous sodium hydroxide solution, a 48 wt % aqueous potassium hydroxide solution, pure water, an amorphous aluminosilicate ($SiO_2$/$Al_2O_3$=18.5) and a seed crystal were mixed to prepare a raw-material composition having the molar composition described below. SSZ-13 was used as the seed crystal, and the molar ratio of DMECHAOH to DMECHABr in the raw-material composition was 1/7.

$SiO_2$/$Al_2O_3$=18.5
$DMECHA/SiO_2$=0.08
$K/SiO_2$=0.11
$Na/SiO_2$=0.04
$H_2O/SiO_2$=15.0
$OH/SiO_2$=0.16
Seed crystal=1.0% by weight The raw-material composition was charged in an airtight container and allowed to react at 150° C. for 48 hours while the container was rotated and stirred at 55 rpm. The resulting crystallized product was subjected to solid-liquid separation, washed with deionized water, and then dried at 110° C. in air. The XRD pattern of the crystallized product showed a single phase of a CHA-type zeolite. The crystallized product had a $SiO_2$/$Al_2O_3$ of 18.1, a ratio SiOH/Si of $0.39 \times 10^{-2}$, and a ratio I of 0.16. The yield of the zeolite was 98%.

Example 2

A crystallized product was obtained as in Example 1 except that a raw-material composition having the molar composition described below was prepared by using an amorphous aluminosilicate in which $SiO_2$/$Al_2O_3$=24.3. The molar ratio of DMECHAOH to DMECHABr in the raw-material composition was 1/1.

$SiO_2$/$Al_2O_3$=24.3
$DMECHA/SiO_2$=0.08
$Na/SiO_2$=0.04
$K/SiO_2$=0.08
$H_2O/SiO_2$=18.0
$OH/SiO_2$=0.16
Seed crystal=1.0% by weight The XRD pattern of the crystallized product showed a single phase of a CHA-type zeolite. The crystallized product had a $SiO_2$/$Al_2O_3$ of 23.0, a ratio SiOH/Si of $0.69 \times 10^{-2}$, and a ratio 1 of 0.58. The yield of the zeolite was 95%. The table below shows the XRD pattern of the CHA-type zeolite (SDA-free CHA-type zeolite) after being calcined at 600° C. for 2 hours in air.

TABLE 10

| 2θ | d-value (Å) | Relative intensity* |
|---|---|---|
| 9.59° | 9.21 | 100 |
| 16.19° | 5.47 | 27 |
| 17.95° | 4.94 | 25 |
| 20.82° | 4.26 | 84 |
| 25.20° | 3.53 | 29 |

*The relative intensity represents a value relative to the intensity at 2θ = 9.59°.

The IR spectrum of the CHA-type zeolite had Peak-1' at 1856 $cm^{-1}$, Peak-2' at 3729 $cm^{-1}$, and Peak-4' at 3593 $cm^{-1}$ and did not have Peak-3'. The ratio P2'/P1' was 0.07, the ratio P3'/P1' was 0, and the ratio P4'/P1' was 0.07.

Incorporation of Copper

In 3.4 g of pure water, 1.05 g of copper nitrate trihydrate was dissolved to prepare a copper nitrate solution. The copper nitrate solution was dripped onto 10.0 g of the CHA-type zeolite after calcination, and mixing and impregnation were conducted in a mortar for 10 minutes. The CHA-type zeolite after calcination used in the mixing step is the CHA-type zeolite with an ammonium type as type of cation, treated by ammonium chloride aqueous solution. The CHA-type zeolite after mixing was dried at 110° C. for one night and then calcined at 550° C. for one hour in air to obtain a copper-containing zeolite. This copper-containing zeolite was used as a copper-containing CHA-type zeolite of this Example.

The copper-containing CHA-type zeolite of this Example had an SAR of 23.0, a copper content of 3.0% by weight, and a ratio Cu/Al of 0.36.

The table below shows the XRD pattern of the copper-containing CHA-type zeolite of this Example.

TABLE 11

| 2θ | d-value (Å) | Relative intensity* |
|---|---|---|
| 9.60° | 9.21 | 100 |
| 16.19° | 5.47 | 36 |
| 17.94° | 4.94 | 31 |
| 20.83° | 4.26 | 116 |
| 25.18° | 3.53 | 42 |

*The relative intensity represents a value relative to the intensity at 2θ = 9.60°.

The XRD pattern of the copper-containing CHA-type zeolite showed that the incorporation of copper in the source-CHA increased the relative intensity of the XRD peak corresponding to 2θ=20.62° to 21.30° by 1.2 times, thus significantly increasing the intensity.

The IR spectrum of the copper-containing CHA-type zeolite had Peak-1 at 1856 $cm^{-1}$, Peak-2 at 3731 $cm^{-1}$, and Peak-4 at 3659 $cm^{-1}$ and did not have Peak-3. The ratio P2/P1 was 0.25, the ratio P3/P1 was 0, and the ratio P4/P1 was 1.63.

Example 3

A crystallized product was obtained as in Example 1 except that a raw-material composition having the molar composition described below was prepared by using an amorphous aluminosilicate in which $SiO_2$/$Al_2O_3$=38.3. The molar ratio of DMECHAOH to DMECHABr in the raw-material composition was 3/1.

$SiO_2/Al_2O_3$=38.3
DMECHA/$SiO_2$=0.08
Na/$SiO_2$=0.06
K/$SiO_2$=0.04
$H_2O$/$SiO_2$=17.0
OH/$SiO_2$=0.16
Seed crystal=1.5% by weight The crystallized product was obtained by conducting crystallization as in Example 1 except that the raw-material composition prepared above was used. The XRD pattern of the crystallized product showed a single phase of a CHA-type zeolite. The crystallized product had a $SiO_2/Al_2O_3$ of 35.5, a ratio SiOH/Si of $1.20 \times 10^{-2}$, and a ratio I of 0.76. The yield of the zeolite was 93%.

Example 4

A crystallized product was obtained as in Example 1 except that a raw-material composition having the molar composition described below was prepared by using an amorphous aluminosilicate in which $SiO_2/Al_2O_3$=51.4 and the reaction temperature was 170° C. The molar ratio of DMECHAOH to DMECHABr in the raw-material composition was 1/1.

$SiO_2/Al_2O_3$=51.4
DMECHA/$SiO_2$=0.10
Na/$SiO_2$=0.08
K/$SiO_2$=0.03
$H_2O$/$SiO_2$=17.0
OH/$SiO_2$=0.16
Seed crystal=1.5% by weight The XRD pattern of the crystallized product showed a single phase of a CHA-type zeolite. The crystallized product had a $SiO_2/Al_2O_3$ of 49.0, a ratio SiOH/Si of $1.72 \times 10^{-2}$, and a ratio I of 0.50. The yield of the zeolite was 95%.

Example 5

A crystallized product was obtained as in Example 1 except that a raw-material composition having the molar composition described below was prepared by using an amorphous aluminosilicate in which $SiO_2/Al_2O_3$=24.3. The molar ratio of DMECHAOH to DMECHABr in the raw-material composition was 3/1.

$SiO_2/Al_2O_3$=24.3
DMECHA/$SiO_2$=0.08
Na/$SiO_2$=0.04
K/$SiO_2$=0.10
$H_2O$/$SiO_2$=15.0
OH/$SiO_2$=0.20
Seed crystal=1.0% by weight The crystallized product was obtained by conducting crystallization as in Example 1 except that the raw-material composition prepared above was used. The XRD pattern of the crystallized product showed a single phase of a CHA-type zeolite. The crystallized product had a $SiO_2/Al_2O_3$ of 22.9 and a ratio I of 0.34. The yield of the zeolite was 94%.

Example 6

A crystallized product was obtained as in Example 1 except that a raw-material composition having the molar composition described below was prepared without using the 25 wt % aqueous DMECHABr solution and by using an amorphous aluminosilicate in which $SiO_2/Al_2O_3$=24.3.

$SiO_2/Al_2O_3$=24.3
DMECHA/$SiO_2$=0.08
Na/$SiO_2$=0.04
K/$SiO_2$=0.12
$H_2O$/$SiO_2$=15.0
OH/$SiO_2$=0.24
Seed crystal=1.0% by weight The XRD pattern of the crystallized product showed a single phase of a CHA-type zeolite. The crystallized product had a $SiO_2/Al_2O_3$ of 21.3 and a ratio I of 0.16. The yield of the zeolite was 88%.

Example 7

A crystallized product was obtained as in Example 1 except that a raw-material composition having the molar composition described below was prepared by using silica gel (product name: Nipsil-VN3, available from Tosoh Silica Corporation) and aluminum isopropoxide (available from Kishida Chemical Co., Ltd.) instead of the amorphous aluminosilicate, and the reaction temperature was 170° C. The molar ratio of DMECHAOH to DMECHABr in the raw-material composition was 3/13.

$SiO_2/Al_2O_3$=35.0
DMECHA/$SiO_2$=0.08
Na/$SiO_2$=0.060
K/$SiO_2$=0.045
$H_2O$/$SiO_2$=17.0
OH/$SiO_2$=0.12
Seed crystal=1.5% by weight The XRD pattern of the crystallized product showed a single phase of a CHA-type zeolite. The crystallized product had a $SiO_2/Al_2O_3$ of 29.5 and a ratio I of 0.51. The yield of the zeolite was 84%.

These Examples showed that a single phase of a CHA-type zeolite could be obtained by the source-CHA production method, though a raw-material composition had a high water content, that is, $H_2O/SiO_2$ of the raw-material composition was 15.0 or more.

In these Examples, although the values of OH/Si of the raw-material compositions are equal to each other, the ratios SiOH/Si of the resulting CHA-type zeolites were different from each other. This shows that the content of hydroxide ions in the raw-material composition is not directly correlated with the amount of silanol in the CHA-type zeolite.

Even though the reaction temperature was as low as 150° C., a single-phase CHA-type zeolite was obtained within a short time of 48 hours in the source-CHA production method disclosed in these Examples. In addition, even when the reaction temperature was a temperature exceeding 150° C., a single phase of a CHA-type zeolite was obtained.

Furthermore, a single phase of a CHA-type zeolite was obtained from a raw-material composition containing only DMECHA$^+$ as an SDA and having a low content of the SDA, that is, a DMECHA/$SiO_2$ of 0.10 or less in the source-CHA production method. This shows that the source-CHA production method is a method for producing a CHA-type zeolite, the method being advantageous, from the industrial viewpoint, in that an SDA that results in a high cost is not used and the amount of SDA used can be reduced.

Comparative Example 1

Crystallization was conducted as in Example 1 except that a raw-material composition having the molar composition described below was prepared by using an amorphous aluminosilicate in which $SiO_2/Al_2O_3$=24.6, and a 25 wt % aqueous N,N,N-trimethylcyclohexylammonium iodide (TMCHAI) solution and a 25 wt % aqueous N,N,N-trimethylcyclohexylammonium hydroxide (TMCHAOH) solution instead of the DMECHA source, and without using a seed crystal. The molar ratio of TMCHAOH to TMCHAI in the raw-material composition was 1/1.
$SiO_2/Al_2O_3$=24.6
$TMCHA/SiO_2$=0.08
$Na/SiO_2$=0.04
$K/SiO_2$=0.08
$H_2O/SiO_2$=15.0
$OH/SiO_2$=0.16
Seed crystal=0.0% by weight However, the raw-material composition of this Comparative Example was not crystallized, and only an amorphous product was obtained.

Comparative Example 2

Crystallization was conducted as in Example 1 except that a raw-material composition having the molar composition described below was prepared by using an amorphous aluminosilicate in which $SiO_2/Al_2O_3$=24.6, and a 25 wt % aqueous N,N,N-triethylcyclohexylammonium iodide (TECHAI) solution and a 25 wt % aqueous N,N,N-triethylcyclohexylammonium hydroxide (TECHAOH) solution as a triethylcyclohexylammonium cation source instead of the DMECHA source. The molar ratio of TECHAOH to TECHAI in the raw-material composition was 1/1.
$SiO_2/Al_2O_3$=24.6
$TECHA/SiO_2$=0.08
$Na/SiO_2$=0.04
$K/SiO_2$=0.08
$H_2O/SiO_2$=15.0
$OH/SiO_2$=0.16
Seed crystal=2.0% by weight However, the raw-material composition of this Comparative Example was not crystallized, and only an amorphous product was obtained.

These Comparative Examples showed that when a raw-material composition containing, as an SDA, only a trimethylcyclohexylammonium cation or triethylcyclohexylammonium cation, which is one of trialkylcyclohexylammonium cations, was used, a CHA-type zeolite was not crystallized within a crystallization time of 48 hours. In the production method in which DMECHA was used as an SDA, a CHA-type zeolite was crystallized within a short time even at a low temperature of 150° C. In contrast, in the production method in which a trialkylcyclohexylammonium cation having the same three alkyl groups was used as an SDA, a CHA-type zeolite was not crystallized at a low temperature. These results showed that the source-CHA production method was also advantageous in that a CHA-type zeolite was crystallized within a short time even at a lower temperature than that in existing production methods, and the energy cost could also be reduced.

Comparative Example 3

Crystallization was conducted as in Example 1 except that a raw-material composition having the molar composition described below was prepared without using the 25 wt % aqueous DMECHAOH solution.
$SiO_2/Al_2O_3$=24.6
$DMECHA/SiO_2$=0.08
$Na/SiO_2$=0.125
$K/SiO_2$=0.08
$H_2O/SiO_2$=15.0
$OH/SiO_2$=0.205
Seed crystal=2.0% by weight However, the raw-material composition of this Comparative Example was not crystallized, and only an amorphous product was obtained.

This showed that even in the case of a raw-material composition containing $DMECHA^+$, a CHA-type zeolite was not crystallized within a crystallization time of 48 hours when $Na/SiO_2$ exceeded the range of the source-CHA production method.

Example 8

A 25 wt % aqueous DMECHABr solution, a 25 wt % aqueous TMAdACl solution, a 48 wt % aqueous sodium hydroxide solution, a 48 wt % aqueous potassium hydroxide solution, pure water and an amorphous aluminosilicate ($SiO_2/Al_2O_3$=24.6) were mixed to prepare a raw-material composition having the molar composition described below.
$SiO_2/Al_2O_3$=24.6
$DMECHA/SiO_2$=0.06
$TMAdA/SiO_2$=0.02
$K/SiO_2$=0.06
$Na/SiO_2$=0.06
$H_2O/SiO_2$=18.0
$OH/SiO_2$=0.12
Seed crystal=0.0% by weight The raw-material composition was charged in an airtight container and allowed to react at 150° C. for 48 hours while the container was rotated and stirred at 55 rpm. The resulting crystallized product was subjected to solid-liquid separation, washed with deionized water, and then dried at 110° C. in air.

The XRD pattern of the crystallized product showed a single phase of a CHA-type zeolite. The crystallized product had a $SiO_2/Al_2O_3$ of 23.9, a ratio SiOH/Si of $0.74 \times 10^{-2}$, and a ratio I of 0.57. The yield of the zeolite was 97%.

Example 9

A crystallized product was obtained as in Example 8 except that a raw-material composition having the molar composition described below was prepared.
$SiO_2/Al_2O_3$=24.6
$DMECHABr/SiO_2$=0.075
$TMAdACl/SiO_2$=0.005
$K/SiO_2$=0.06
$Na/SiO_2$=0.06
$H_2O/SiO_2$=18.0
$OH/SiO_2$=0.12
Seed crystal=0.0% by weight The XRD pattern of the crystallized product showed a single phase of a CHA-type zeolite. The crystallized product had a $SiO_2/Al_2O_3$ of 23.9, a ratio SiOH/Si of $0.72 \times 10^{-2}$, and a ratio I of 0.57. The yield of the zeolite was 97%.

Incorporation of Copper

In 3.4 g of pure water, 1.05 g of copper nitrate trihydrate was dissolved to prepare a copper nitrate solution. The copper nitrate solution was dripped onto 10.0 g of the CHA-type zeolite after calcination (type of cation: ammonium type), and mixing and impregnation were conducted in a mortar for 10 minutes. The CHA-type zeolite after mixing was dried at 110° C. for one night and then calcined at 550° C. for one hour in air to obtain a copper-containing zeolite. This copper-containing zeolite was used as a copper-containing CHA-type zeolite of this Example.

The copper-containing CHA-type zeolite of this Example had an SAR of 23.9, a copper content of 3.0% by weight, and a ratio Cu/Al of 0.37.

The table below shows the XRD pattern of the copper-containing CHA-type zeolite of this Example.

TABLE 12

| 2θ | d-value (Å) | Relative intensity* |
|---|---|---|
| 9.59° | 9.22 | 100 |
| 16.19° | 5.47 | 36 |
| 17.94° | 4.94 | 31 |
| 20.82° | 4.26 | 118 |
| 25.18° | 3.53 | 45 |

*The relative intensity represents a value relative to the intensity at 2θ = 9.59°.

The IR spectrum of the copper-containing CHA-type zeolite had Peak-1 at 1859 $cm^{-1}$, Peak-2 at 3730 $cm^{-1}$, and Peak-4 at 3659 $cm^{-1}$ and did not have Peak-3. The ratio P2/P1 was 0.22, the ratio P3/P1 was 0, and the ratio P4/P1 was 1.44.

Example 10

A crystallized product was obtained as in Example 8 except that a raw-material composition having the molar composition described below was prepared by using a 25 wt % aqueous TMAdAOH solution instead of the 25 wt % aqueous TMAdACl solution and using an amorphous aluminosilicate in which $SiO_2/Al_2O_3$=30.3.

$SiO_2/Al_2O_3$=30.3
$DMECHA/SiO_2$=0.06
$TMAdA/SiO_2$=0.02
$K/SiO_2$=0.04
$Na/SiO_2$=0.06
$H_2O/SiO_2$=18.0
$OH/SiO_2$=0.12
Seed crystal=0.0% by weight The crystallized product was obtained by conducting crystallization as in Example 1 except that the raw-material composition prepared above was used. The XRD pattern of the crystallized product showed a single phase of a CHA-type zeolite. The crystallized product had a $SiO_2/Al_2O_3$ of 29.7, a ratio SiOH/Si of $0.98 \times 10^{-2}$, and a ratio I of 0.59. The yield of the zeolite was 98%.

Example 11

A crystallized product was obtained as in Example 8 except that a raw-material composition having the molar composition described below was prepared by using a 25 wt % aqueous DMECHAOH solution in addition to the 25 wt % aqueous DMECHABr solution, using a 25 wt % aqueous TMAdAOH solution instead of the 25 wt % aqueous TMAdACl solution, and using an amorphous aluminosilicate in which $SiO_2/Al_2O_3$=30.3. The molar ratio of DMECHAOH to DMECHABr in the raw-material composition was 3/15.

$SiO_2/Al_2O_3$=30.3
$DMECHA/SiO_2$=0.06
$TMAdA/SiO_2$=0.005
$K/SiO_2$=0.04
$Na/SiO_2$=0.06
$H_2O/SiO_2$=18.0
$OH/SiO_2$=0.12
Seed crystal=0.0% by weight The XRD pattern of the crystallized product showed a single phase of a CHA-type zeolite. The crystallized product had a $SiO_2/Al_2O_3$ of 29.7 and a ratio I of 0.62. The yield of the zeolite was 98%.

Example 12

A crystallized product was obtained as in Example 8 except that a raw-material composition having the molar composition described below was prepared by using a 25 wt % aqueous TMAdAOH solution instead of the 25 wt % aqueous TMAdACl solution, and using an amorphous aluminosilicate in which $SiO_2/Al_2O_3$=24.6.

$SiO_2/Al_2O_3$=24.6
$DMECHA/SiO_2$=0.06
$TMAdA/SiO_2$=0.02
$K/SiO_2$=0.12
$Na/SiO_2$=0.08
$H_2O/SiO_2$=18.0
$OH/SiO_2$=0.22
Seed crystal=0.0% by weight The XRD pattern of the crystallized product showed a single phase of a CHA-type zeolite. The crystallized product had a $SiO_2/Al_2O_3$ of 24.0 and a ratio SiOH/Si of $0.88 \times 10^{-2}$. The yield of the zeolite was 98%. The table below shows the XRD pattern of the CHA-type zeolite after being calcined at 600° C. for 2 hours in air.

TABLE 13

| 2θ | d-value (Å) | Relative intensity* |
|---|---|---|
| 9.60° | 9.20 | 100 |
| 16.20° | 5.47 | 26 |
| 17.99° | 4.93 | 25 |
| 20.83° | 4.26 | 80 |
| 25.20° | 3.53 | 29 |

*The relative intensity represents a value relative to the intensity at 2θ = 9.60°.

The IR spectrum of the CHA-type zeolite had Peak-1' at 1856 $cm^{-1}$, Peak-2' at 3729 $cm^{-1}$, and Peak-4' at 3594 $cm^{-1}$ and did not have Peak-3'. The ratio P2'/P1' was 0.42, the ratio P3'/P1' was 0, and the ratio P4'/P1' was 0.08. Incorporation of Copper In 3.4 g of pure water, 1.05 g of copper nitrate trihydrate was dissolved to prepare a copper nitrate solution. The copper nitrate solution was dripped onto 10.0 g of the CHA-type zeolite after calcination (type of cation: ammonium type), and mixing and impregnation were conducted in a mortar for 10 minutes. The CHA-type zeolite after mixing was dried at 110° C. for one night and then calcined at 550° C. for one hour in air to obtain a copper-containing zeolite. This copper-containing zeolite was used as a copper-containing CHA-type zeolite of this Example.

The copper-containing CHA-type zeolite of this Example had an SAR of 24.0, a copper content of 3.0% by weight, and a ratio Cu/Al of 0.37.

The table below shows the XRD pattern of the copper-containing CHA-type zeolite of this Example.

TABLE 14

| 2θ | d-value (Å) | Relative intensity* |
|---|---|---|
| 9.60° | 9.21 | 100 |
| 16.20° | 5.47 | 35 |
| 17.96° | 4.93 | 30 |
| 20.83° | 4.26 | 117 |
| 25.20° | 3.53 | 42 |

*The relative intensity represents a value relative to the intensity at 2θ = 9.60°.

The IR spectrum of the copper-containing CHA-type zeolite had Peak-1 at 1859 cm$^{-1}$, Peak-2 at 3730 cm$^{-1}$, and Peak-4 at 3657 cm$^{-1}$ and did not have Peak-3. The ratio P2/P1 was 0.63, the ratio P3/P1 was 0, and the ratio P4/P1 was 1.38.

Example 13

A crystallized product was obtained as in Example 8 except that a raw-material composition having the molar composition described below was prepared by using a 25 wt % aqueous TMAdAOH solution instead of the 25 wt % aqueous TMAdACl solution and using an amorphous aluminosilicate in which $SiO_2/Al_2O_3$=23.1.

$SiO_2/Al_2O_3$=23.1
DMECHA/$SiO_2$=0.06
TMAdA/$SiO_2$=0.02
K/$SiO_2$=0.12
Na/$SiO_2$=0.08
$H_2O$/$SiO_2$=18.0
OH/$SiO_2$=0.22
Seed crystal=0.0% by weight The XRD pattern of the crystallized product showed a single phase of a CHA-type zeolite. The table below shows the XRD pattern of the CHA-type zeolite after being calcined at 600° C. for 2 hours in air.

TABLE 15

| 2θ | d-value (Å) | Relative intensity* |
|---|---|---|
| 9.59° | 9.22 | 100 |
| 16.18° | 5.47 | 26 |
| 17.96° | 4.93 | 24 |
| 20.81° | 4.26 | 83 |
| 25.20° | 3.53 | 28 |

*The relative intensity represents a value relative to the intensity at 2θ = 9.59°.

Example 14

A crystallized product was obtained as in Example 8 except that a raw-material composition having the molar composition described below was prepared by using a 25 wt % aqueous TMAdAOH solution instead of the 25 wt % aqueous TMAdACl solution and using an amorphous aluminosilicate in which $SiO_2/Al_2O_3$=13.0.

$SiO_2/Al_2O_3$=13.0
DMECHA/$SiO_2$=0.03
TMAdA/$SiO_2$=0.04
K/$SiO_2$=0.07
Na/$SiO_2$=0.11
$H_2O$/$SiO_2$=18
OH/$SiO_2$=0.22

The XRD pattern of the crystallized product showed a single phase of a CHA-type zeolite. The crystallized product had a $SiO_2/Al_2O_3$ of 13.3. The IR spectrum of the CHA-type zeolite had Peak-1' at 1858 cm$^{-1}$, Peak-2' at 3738 cm$^{-1}$, and Peak-4' at 3666 cm$^{-1}$ and did not have Peak-3'. The ratio P2'/P1' was 1.00, the ratio P3'/P1' was 0, and the ratio P4'/P1' was 11.33.

Incorporation of Copper

In 3.8 g of pure water, 1.14 g of copper nitrate trihydrate was dissolved to prepare a copper nitrate solution. The copper nitrate solution was dripped onto 10.0 g of the CHA-type zeolite after calcination (type of cation: ammonium type), and mixing and impregnation were conducted in a mortar for 10 minutes. The CHA-type zeolite after mixing was dried at 110° C. for one night and then calcined at 550° C. for one hour in air to obtain a copper-containing zeolite. This copper-containing zeolite was used as a copper-containing CHA-type zeolite of this Example.

The copper-containing CHA-type zeolite of this Example had an SAR of 13.3, a copper content of 3.0% by weight, and a ratio Cu/Al of 0.22.

The IR spectrum of the copper-containing CHA-type zeolite had Peak-1 at 1857 cm$^{-1}$, Peak-2 at 3736 cm$^{-1}$, and Peak-4 at 3663 cm$^{-1}$ and did not have Peak-3. The ratio P2/P1 was 0.75, the ratio P3/P1 was 0, and the ratio P4/P1 was 6.25.

Example 15

A crystallized product was obtained as in Example 2 except that a raw-material composition having the molar composition described below was prepared by using an amorphous aluminosilicate in which $SiO_2/Al_2O_3$=13.4.

$SiO_2/Al_2O_3$=13.4
DMECHA/$SiO_2$=0.08
K/$SiO_2$=0.14
Na/$SiO_2$=0.04
$H_2O$/$SiO_2$=18
OH/$SiO_2$=0.22
Seed crystal=0.5% by weight The XRD pattern of the crystallized product showed a single phase of a CHA-type zeolite. The crystallized product had a $SiO_2/Al_2O_3$ of 13.5.

The IR spectrum of the CHA-type zeolite had Peak-1' at 1852 cm$^{-1}$, Peak-2' at 3742 cm$^{-1}$, and Peak-4' at 3661 cm$^{-1}$ and did not have Peak-3'. The ratio P2'/P1' was 0.25, the ratio P3'/P1' was 0, and the ratio P4'/P1' was 2.63.

Incorporation of Copper

In 1.5 g of pure water, 0.45 g of copper nitrate trihydrate was dissolved to prepare a copper nitrate solution. The copper nitrate solution was dripped onto 4.0 g of the CHA-type zeolite after calcination (type of cation: ammonium type), and mixing and impregnation were conducted in a mortar for 10 minutes. The CHA-type zeolite after mixing was dried at 110° C. for one night and then calcined at 550° C. for one hour in air to obtain a copper-containing zeolite. This copper-containing zeolite was used as a copper-containing CHA-type zeolite of this Example.

The copper-containing CHA-type zeolite of this Example had an SAR of 13.5, a copper content of 3.0% by weight, and a ratio Cu/Al of 0.22.

The IR spectrum of the copper-containing CHA-type zeolite had Peak-1 at 1857 cm$^{-1}$, Peak-2 at 3740 cm$^{-1}$, and Peak-4 at 3656 cm$^{-1}$ and did not have Peak-3. The ratio P2/P1 was 0.75, the ratio P3/P1 was 0, and the ratio P4/P1 was 4.75.

Comparative Example 4

A CHA-type zeolite was synthesized in accordance with the method described in U.S. Patent Application Publication No. 2011/0251048. Specifically, a 25% aqueous TMAdAOH solution, pure water, a 48% aqueous sodium hydroxide solution, a 48% aqueous potassium hydroxide solution, and an amorphous aluminosilicate were mixed to prepare a raw-material composition having the composition described below.

$SiO_2/Al_2O_3=32.3$
$TMAdA/SiO_2=0.08$
$K/SiO_2=0.08$
$Na/SiO_2=0.08$
$H_2O/SiO_2=18.0$
$OH/SiO_2=0.25$

A crystallized product was obtained as in Example 1 except that the raw-material composition prepared above was used. This crystallized product was used as a CHA-type zeolite of this Comparative Example.

The XRD pattern of the CHA-type zeolite of this Comparative Example showed a single phase of a CHA-type zeolite. The CHA-type zeolite of this Comparative Example had a $SiO_2/Al_2O_3$ of 31.0 and a ratio SiOH/Si of $1.70\times10^{-2}$.

The table below shows the XRD pattern of the CHA-type zeolite of this Comparative Example.

TABLE 16

| 2θ | d-value (Å) | Relative intensity* |
|---|---|---|
| 9.60° | 9.21 | 100 |
| 16.21° | 5.46 | 31 |
| 17.94° | 4.94 | 29 |
| 20.85° | 4.26 | 99 |
| 25.17° | 3.54 | 39 |

*The relative intensity represents an intensity relative to the peak intensity at 2θ = 9.60°.

The IR spectrum of the CHA-type zeolite had Peak-1' at $1859\ cm^{-1}$, Peak-2' at $3733\ cm^{-1}$, Peak-3' at $3481\ cm^{-1}$, and Peak-4' at $3597\ cm^{-1}$. The ratio P2'/P1' was 1.67, the ratio P3'/P1' was 0.07, and the ratio P4'/P1' was 0.07.

The results showed that the CHA-type zeolite obtained from the raw-material composition containing only $TMAdA^+$ as an SDA had an XRD pattern which differed from that of the CHA-type zeolite obtained by crystalizing a raw-material composition containing $DMECHA^+$ in relative intensities.

Incorporation of Copper

In 3.75 g of pure water, 1.13 g of copper nitrate trihydrate was dissolved to prepare a copper nitrate solution. The copper nitrate solution was dripped onto 10.8 g of the CHA-type zeolite after calcination (type of cation: ammonium-type), and mixing and impregnation were conducted in a mortar for 10 minutes. The CHA-type zeolite after mixing was dried at 110° C. for one night and then calcined at 550° C. for one hour in air to obtain a copper-containing zeolite. This copper-containing zeolite was used as a copper-containing CHA-type zeolite of this Comparative Example.

The copper-containing CHA-type zeolite of this Comparative Example had an SAR of 31.0, a copper content of 3.0% by weight, and a ratio Cu/Al of 0.47.

The table below shows the XRD pattern of the copper-containing CHA-type zeolite of this Comparative Example.

TABLE 17

| 2θ | d-value (Å) | Relative intensity* |
|---|---|---|
| 9.59° | 9.21 | 100 |
| 16.19° | 5.47 | 33 |
| 17.96° | 4.94 | 29 |
| 20.82° | 4.26 | 104 |
| 25.20° | 3.53 | 57 |

*The relative intensity represents a value relative to the intensity at 2θ = 9.59°.

The IR spectrum of the copper-containing CHA-type zeolite had Peak-1 at $1861\ cm^{-1}$, Peak-2 at $3733\ cm^{-1}$, and Peak-4 at $3660\ cm^{-1}$ and did not have Peak-3. The ratio P2/P1 was 1.63, the ratio P3/P1 was 0, and the ratio P4/P1 was 1.13.

Comparative Example 5

SSZ-13 was synthesized in accordance with the methods described in Examples 1 and 5 of U.S. Pat. No. 4,665,110. Specifically, 105 mL of dimethyl formamide (Kishida Chemical Co., Ltd.) was added to 17.5 g of 1-adamantanamine (Sigma-Aldrich) to dissolve 1-adamantanamine. After the dissolution, 50.8 g of tributylamine (Kishida Chemical Co., Ltd.) was added thereto, and 49.7 g of methyl iodide (Wako Pure Chemical Corporation) was gradually added dropwise to the resulting reaction mixture while the reaction mixture was stirred in an ice bath.

After the dropwise addition of methyl iodide, the reaction mixture was allowed to react by being stirred for five days to obtain a white precipitate. The white precipitate was washed with 100 mL of diethyl ether (Kishida Chemical Co., Ltd.) five times and dried under reduced pressure to obtain a white powder.

According to the results of the elemental analysis and NMR measurement of the white powder obtained above, the white powder was identified to be N,N,N-trimethyladamantammonium iodide (hereinafter referred to as "Template A").

A solution 1 was prepared by mixing 13.6 g of Ludox AS-30 and 5.3 g of Template A with water. A solution 2 was prepared by mixing 1.1 g of $Al_2(SO_4)_3 \cdot 18H_2O$ and 2.91 g of solid potassium hydroxide with water.

The solution 2 was added to and mixed with the solution 1 to obtain a homogeneous milky white solution. The solution after mixing was charged and sealed in a 80-mL stainless steel reactor and heated at 150° C. for six days while rotating the reactor at 30 rpm to obtain a product. The resulting product was washed with water, methanol, and acetone in this order and dried at 110° C. to obtain a white powder.

The XRD pattern of the white powder obtained above showed a single phase of SSZ-13, and $SiO_2/Al_2O_3$ of the white powder was found to be 28.3. However, the average crystal size of the SSZ-13 of this Comparative Example could not be evaluated because the SSZ-13 was formed of only aggregate crystal particles.

Measurement Examples

Nitrogen oxide reduction properties of the copper-containing CHA-type zeolites obtained in Example 9 and Comparative Example 4 were measured. The conditions are as follows.

Hydrothermal Aging Treatment

A copper-containing CHA-type zeolite was molded and crushed to prepare agglomerate particles having an agglomerate size of 12 to 20 mesh. An atmospheric pressure fixed-bed flow reaction tube was filled with 3 mL of the agglomerate particles of the copper-containing CHA-type zeolite, and air containing 10% by volume of water was then allowed to flow through the reaction tube to perform hydrothermal aging treatment under the conditions described below.

Flow rate of air: 300 mL/min
Treatment temperature: 900° C.
Treatment time: 3 hours Method for Measuring Nitrogen Oxide Reduction Rate (%)

Each of the samples before and after the hydrothermal aging treatment was molded and disintegrated to prepare agglomerate particles having an agglomerate size of 12 to 20 mesh. An atmospheric pressure fixed-bed flow reaction tube was filled with 1.5 mL of the sample of the agglomerate particles. A nitrogen oxide-containing gas was allowed to flow through the reaction tube while maintaining the measurement temperature below, and nitrogen oxide concentrations at an inlet and an outlet of the atmospheric pressure fixed-bed flow reaction tube were measured. The flowing conditions of the nitrogen oxide-containing gas are as follows.

Composition of nitrogen oxide-containing gas:
NO 200 ppm
$NH_3$ 200 ppm
$O_2$ 10% by volume
$H_2O$ 3% by volume
$N_2$ Balance
Flow rate of nitrogen oxide-containing gas: 1.5 L/min
Space velocity: 60,000 hour$^{-1}$
Measurement temperature: 150° C.

A nitrogen oxide reduction rate was determined from the nitrogen oxide concentrations in accordance with the following formula:

Nitrogen oxide reduction rate (%)={([NOx]in −[NOx]out)/[NOx]in}×100

In the formula, [NOx]in represents the nitrogen oxide concentration of the nitrogen oxide-containing gas at the inlet of the atmospheric pressure fixed-bed flow reaction tube, and [NOx]out represents the nitrogen oxide concentration of the nitrogen oxide-containing gas at the outlet of the atmospheric pressure fixed-bed flow reaction tube.

Figure 3:
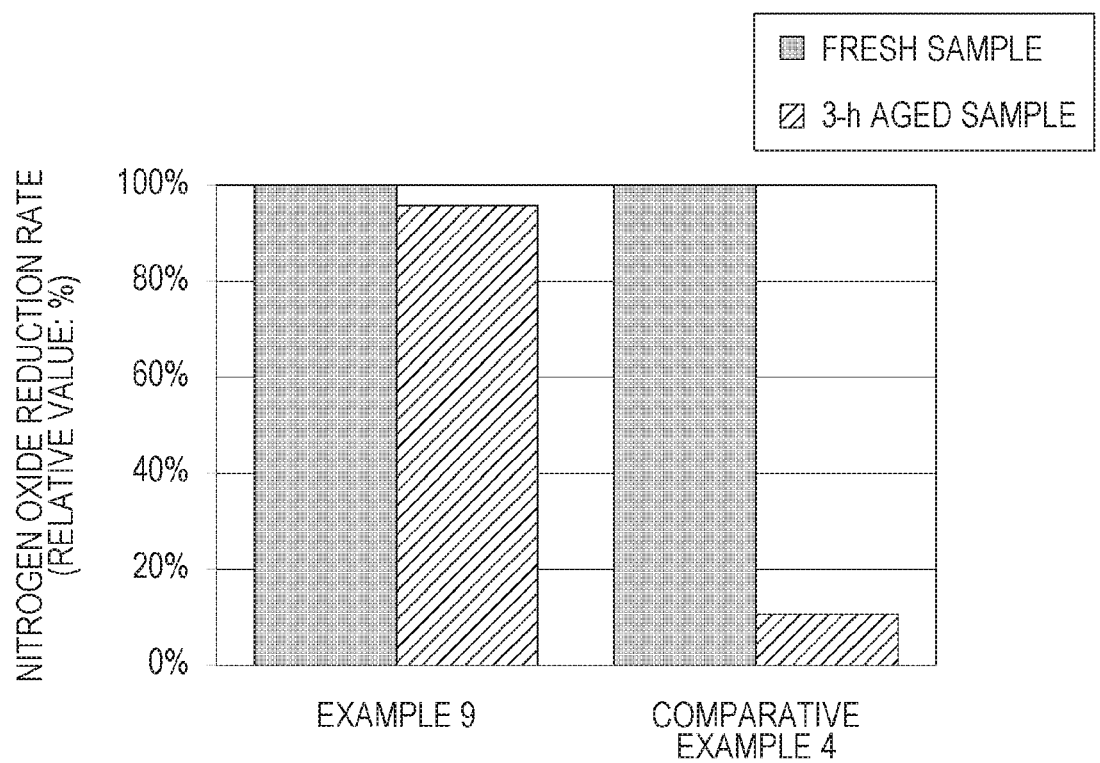
FIG. 3 is a graph showing nitrogen oxide reduction rates (relative values) of Example and Comparative Example.

The table below and FIG. 3 show a ratio of the nitrogen oxide reduction rate of each copper-containing CHA-type zeolite after the hydrothermal aging treatment (hereinafter also referred to as a "3-h aged sample") to the nitrogen oxide reduction rate of the copper-containing CHA-type zeolite before the hydrothermal aging treatment (hereinafter also referred to as a "fresh sample").

TABLE 18

| | Nitrogen oxide reduction rate of 3-h aged sample (Relative value: %) |
|---|---|
| Example 9 | 95.8 |
| Comparative Example 4 | 10.7 |

The copper-containing CHA-type zeolite of Comparative Example 4 is a copper-containing CHA-type zeolite in which a decrease in the nitrogen oxide reduction rate is relatively small. On the other hand, the copper-containing CHA-type zeolite of Example 9 was advantageous in that the fresh sample not only exhibited substantially the same nitrogen oxide reduction rate as that of Comparative Example 4, but also could maintain the nitrogen oxide reduction rate even after a thermal load was applied for a long time. These results showed that the copper-containing CHA-type zeolite of the present embodiment advantageously not only had good nitrogen oxide reduction properties but also could be used as a catalyst with a long life when used as a catalyst for reduction of nitrogen oxides. Furthermore, the copper-containing CHA-type zeolite of the present embodiment had higher heat resistance than the existing copper-containing CHA-type zeolite and could be used as a catalyst for reduction of nitrogen oxides, in which a decrease in the nitrogen oxide reduction rate was extremely small even at a low temperature of 150° C.

The metal-containing CHA-type zeolite of the embodiment can be used as a catalyst and can be provided, in particular, as a catalyst for reduction of nitrogen oxides, and further, a catalyst for reduction of nitrogen oxides in urea SCR. Furthermore, the source-CHA can be used as a catalyst support or an adsorbent support, and the method for producing the source-CHA can be used as a method for industrially producing a CHA-type zeolite.

The entire contents of the specification, claims, drawings, and abstract of Japanese Patent Application No. 2017-197491 filed in the Japan Patent Office on Oct. 11, 2017 are cited and incorporated herein as a disclosure of the specification of the present invention.

What is claimed is:

1. A transition metal-containing CHA-type zeolite wherein a ratio of a maximum intensity of an absorption peak in a range of 3685 cm$^{-1}$ or more and 3750 cm$^{-1}$ or less to a maximum intensity of an absorption peak in a range of 1800 cm$^{-1}$ or more and 1930 cm$^{-1}$ or less is less than 1.5 in an IR spectrum and a molar ratio of silica to alumina is 40.0 or less.

2. The transition metal-containing CHA-type zeolite according to claim 1, wherein a ratio of a maximum intensity of an absorption peak in a range of 3450 cm$^{-1}$ or more and 3545 cm$^{-1}$ or less to the maximum intensity of the absorption peak in the range of 1800 cm$^{-1}$ or more and 1930 cm$^{-1}$ or less is less than 1.6 in the IR spectrum.

3. The transition metal-containing CHA-type zeolite according to claim 1, wherein a ratio of a maximum intensity of an absorption peak in a range of 3550 cm$^{-1}$ or more and 3680 cm$^{-1}$ or less to the maximum intensity of the absorption peak in the range of 1800 cm$^{-1}$ or more and 1930 cm$^{-1}$ or less is less than 7.0 in the IR spectrum.

4. The transition metal-containing CHA-type zeolite according to claim 1, wherein an XRD pattern of the transition metal-containing CHA-type zeolite has at least XRD peaks shown in a table below:

| 2θ | d-value (Å) | Relative Intensity |
|---|---|---|
| 9.44° to 9.88° | 9.36 to 8.94 | 100 |
| 16.03° to 16.55° | 5.52 to 5.35 | 10 or more and 50 or less |
| 17.81° to 18.24° | 4.98 to 4.86 | 10 or more and 50 or less |
| 20.62° to 21.30° | 4.30 to 4.17 | 105 or more and 150 or less |
| 25.02° to 25.50° | 3.56 to 3.49 | 40 or more and 60 or less | where the relative intensity represents an intensity relative to a peak intensity at 2θ=9.44° to 9.88°.

5. The transition metal-containing CHA-type zeolite according to claim 1, wherein a molar ratio of silica to alumina is 10.0 or more and 31.5 or less.

6. The transition metal-containing CHA-type zeolite according to claim 1, wherein a molar ratio of silica to alumina is 10.0 or more and 30.0 or less.

7. The transition metal-containing CHA-type zeolite according to claim 1, wherein the transition metal-containing CHA-type zeolite contains at least one of iron or copper as a metal.

8. The transition metal-containing CHA-type zeolite according to claim 1, wherein a molar ratio of copper to aluminum is 0.10 or more and 0.50 or less.

9. A method for producing the transition metal-containing CHA-type zeolite according to claim 1, the method comprising a metal incorporation step of mixing a metal source and a CHA-type zeolite in which a ratio of a maximum intensity of an absorption peak in a range of 3665 cm$^{-1}$ or more and 3750 cm$^{-1}$ or less to a maximum intensity of an absorption peak in a range of 1800 cm$^{-1}$ or more and 1930 cm$^{-1}$ or less is less than 1.5 in an IR spectrum and a molar ratio of silica to alumina is 40.0 or less.

10. The method according to claim 9, wherein a ratio of a maximum intensity of an absorption peak in a range of 3450 cm$^{-1}$ or more and 3545 cm$^{-1}$ or less to the maximum intensity of the absorption peak in the range of 1800 cm$^{-1}$ or more and 1930 cm$^{-1}$ or less is less than 1.6 in the CHA-type zeolite.

11. The method according to claim 9, wherein an XRD pattern of the CHA-type zeolite has at least XRD peaks shown in a table below:

| 2θ | d-value (Å) | Relative Intensity |
|---|---|---|
| 9.44° to 9.88° | 9.36 to 8.94 | 100 |
| 16.03° to 16.55° | 5.52 to 5.35 | 11 or more and 34 or less |
| 17.81° to 18.24° | 4.98 to 4.86 | 10 or more and 50 or less |
| 20.62° to 21.30° | 4.30 to 4.17 | 61 or more and 98 or less |
| 25.02° to 25.50° | 3.56 to 3.49 | 20 or more and 60 or less | where the relative intensity represents an intensity relative to a peak intensity at 2θ=9.44° to 9.88°.

12. The method according to claim 9, wherein a molar ratio of silica to alumina in the CHA-type zeolite is 10.0 or more and 30.0 or less.

13. The method according to claim 9, wherein a molar ratio of silanol groups to silicon in the CHA-type zeolite is 0.15×10$^{-2}$ or more and 1.80×10$^{-2}$ or less.

14. A catalyst comprising the transition metal-containing CHA-type zeolite according to claim 1.

15. A method for reducing a nitrogen oxide, the method comprising using the transition metal-containing CHA-type zeolite according to claim 1.

16. A transition metal-containing CHA-type zeolite wherein a ratio of a maximum intensity of an absorption peak in a range of 3685 cm$^{-1}$ or more and 3750 cm$^{-1}$ or less to a maximum intensity of an absorption peak in a range of 1800 cm$^{-1}$ or more and 1930 cm$^{-1}$ or less is 0.7 or less in an IR spectrum.

17. A metal-containing CHA-type zeolite wherein a ratio of a maximum intensity of an absorption peak in a range of 3685 cm$^{-1}$ or more and 3750 cm$^{-1}$ or less to a maximum intensity of an absorption peak in a range of 1800 cm$^{-1}$ or more and 1930 cm$^{-1}$ or less is less than 1.5 in an IR spectrum, and an XRD pattern of the metal-containing CHA-type zeolite has at least XRD peaks shown in a table below:

| 2θ | d-value (Å) | Relative Intensity |
|---|---|---|
| 9.44° to 9.88° | 9.36 to 8.94 | 100 |
| 16.03° to 16.55° | 5.52 to 5.35 | 10 or more and 50 or less |
| 17.81° to 18.24° | 4.98 to 4.86 | 10 or more and 50 or less |
| 20.62° to 21.30° | 4.30 to 4.17 | 105 or more and 150 or less |
| 25.02° to 25.50° | 3.56 to 3.49 | 40 or more and 60 or less | where the relative intensity represents an intensity relative to a peak intensity at 2θ=9.44° to 9.88°.

18. A method for producing a metal-containing CHA-type zeolite wherein a ratio of a maximum intensity of an absorption peak in a range of 3685 cm$^{-1}$ or more and 3750 cm$^{-1}$ or less to a maximum intensity of an absorption peak in a range of 1800 cm$^{-1}$ or more and 1930 cm$^{-1}$ or less is less than 1.5 in an IR spectrum, the method comprising a copper-incorporation step of mixing a copper source and a CHA-type zeolite in which a ratio of a maximum intensity of an absorption peak in a range of 3665 cm$^{-1}$ or more and 3750 cm$^{-1}$ or less to a maximum intensity of an absorption peak in a range of 1800 cm$^{-1}$ or more and 1930 cm$^{-1}$ or less is less than 1.5, and an XRD pattern of the metal-containing CHA-type zeolite has at least XRD peaks shown in a table below:

| 2θ | d-value (Å) | Relative Intensity |
|---|---|---|
| 9.44° to 9.88° | 9.36 to 8.94 | 100 |
| 16.03° to 16.55° | 5.52 to 5.35 | 11 or more and 34 or less |
| 17.81° to 18.24° | 4.98 to 4.86 | 10 or more and 50 or less |
| 20.62° to 21.30° | 4.30 to 4.17 | 61 or more and 98 or less |
| 25.02° to 25.50° | 3.56 to 3.49 | 20 or more and 60 or less | where the relative intensity represents an intensity relative to a peak intensity at 2θ=9.44° to 9.88°.

* * * * *